(12) United States Patent
Kise

(10) Patent No.: US 6,876,677 B1
(45) Date of Patent: Apr. 5, 2005

(54) DEVICE FOR CONTROLLING SIGNAL BANDS IN A PACKET NETWORK

(75) Inventor: Yukio Kise, Osaka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/098,230

(22) Filed: Jun. 16, 1998

(30) Foreign Application Priority Data

Oct. 28, 1997 (JP) .............................................. 9-296024

(51) Int. Cl.⁷ ............................. H04J 3/12; H04L 12/56
(52) U.S. Cl. ...................................... 370/524; 370/410
(58) Field of Search ................................ 370/395, 467, 370/465, 395.2, 389, 230–235, 395.21, 395.3, 395.31, 522, 524, 352, 354, 410

(56) References Cited

U.S. PATENT DOCUMENTS

| | | | | |
|---|---|---|---|---|
| 5,333,131 A | * | 7/1994 | Tanabe et al. | 370/397 |
| 5,452,297 A | * | 9/1995 | Hiller et al. | 370/395.61 |
| 5,483,527 A | * | 1/1996 | Doshi et al. | 370/60.1 |
| 5,797,010 A | * | 8/1998 | Brown | 395/712 |
| 5,805,682 A | * | 9/1998 | Voit et al. | 379/142 |
| 5,825,780 A | * | 10/1998 | Christie | 370/522 |
| 5,953,338 A | * | 9/1999 | Ma et al. | 370/395.21 |
| 5,974,050 A | * | 10/1999 | Thomas et al. | 370/422 |
| 6,097,722 A | * | 8/2000 | Graham et al. | 370/395.21 |
| 6,151,325 A | * | 11/2000 | Hluchyj | 370/398 |
| 6,195,352 B1 | * | 2/2001 | Cushman et al. | 370/395.6 |
| 6,510,136 B1 | * | 1/2003 | Tanaka et al. | 370/230 |

* cited by examiner

Primary Examiner—Seema S. Rao
Assistant Examiner—Ron Abelson
(74) Attorney, Agent, or Firm—Katten Muchin Zavis Rosenman

(57) ABSTRACT

A first ATM multiplexing node is connected to a second ATM multiplexing node via an ATM network. A number of calls detecting unit detects the number of voice calls set up on the transmission path that connects the first ATM multiplexing node to the second ATM multiplexing node. A signal VC capturing unit captures signal VCs in accordance with the additional number of voice calls detected by the number of calls detecting unit. A signal VC releasing unit releases signal VCs in accordance with the decrease in the number of calls detected by the number of calls detecting unit.

19 Claims, 41 Drawing Sheets

FIG. 8A

PATH SUPERVISION DATA 301

| ATM ADDRESS | PATH NUMBER | (S) |
|---|---|---|

FIG. 8B

BAND SUPERVISION DATA 302

| PATH NUMBER | BASIC NUMBER OF SIGNAL VCs | (S) |
|---|---|---|
| | BASIC NUMBER OF CALLS (Call/kbps) | (S) |
| | BASIC VC BAND (kbps/VC) | (S) |
| | BAND CAPACITY (kbps) | (S/D) |
| | VPI/VCI | (S) |
| | AVERAGE BAND | (S/D) |

VPI/VCI SUPERVISION DATA 303

| PATH NUMBER | |
|---|---|
| VPI/VCI → | VPI/VCI (S) |
| | NEXT VPI/VCI (S) |
| | VC BAND (kbps) (S/D) |
| | NUMBER OF ARRIVED CALLS IN PROGRESS (call) (D) |
| | NUMBER OF ORIGINATED CALLS IN PROGRESS (call) (D) |
| | NUMBER OF VC VOICE CALLS (call) (S) |
| | NUMBER OF VOICE CALLS PLACED (call) (D) |
| | NUMBER OF VOICE CALLS FOR WHICH RESETTING IS EXECUTED (S) |

FIG. 9A

SYSTEM CONDITIONS SUPERVISION DATA 304

| PRESENT DATE |
|---|
| PRESENT DAY OF WEEK |
| PRESENT TIME OF DAY (HH) |
| SYSTEM FIXED BAND |
| LEARNING SELECTION CONDITION |
| SEQUENTIAL VC BAND CAPTURE CONDITION |

| PATH NUMBER | DAY OF WEEK | TIME | |
|---|---|---|---|
| | | TIME PERIOD (NUMBER OF DAYS) (S) | |
| | | TIME INTERVAL (TIME OF DAY) (S) | |
| | | NUMBER OF SIGNAL VSs (S) | |
| | | NUMBER OF VC VOICE CALLS (S) | |
| | | NUMBER OF VOICE CALLS PLACED (D) | |
| | | AVERAGE BAND (D) | |

DAY OF WEEK NUMBER OF VCs SUPERVISION DATA 305

FIG. 10B

| PATH NUMBER | DAY OF MONTH | |
|---|---|---|
| | TIME PERIOD (NUMBER OF DAYS) (S) | |
| | NUMBER OF SIGNAL VCs (S) | |
| | NUMBER OF VC VOICE CALLS (S) | |
| | NUMBER OF VOICE CALLS PLACED (D) | |
| | AVERAGE BAND (D) | |

DATE OF MONTH NUMBER OF VCs SUPERVISION DATA 306

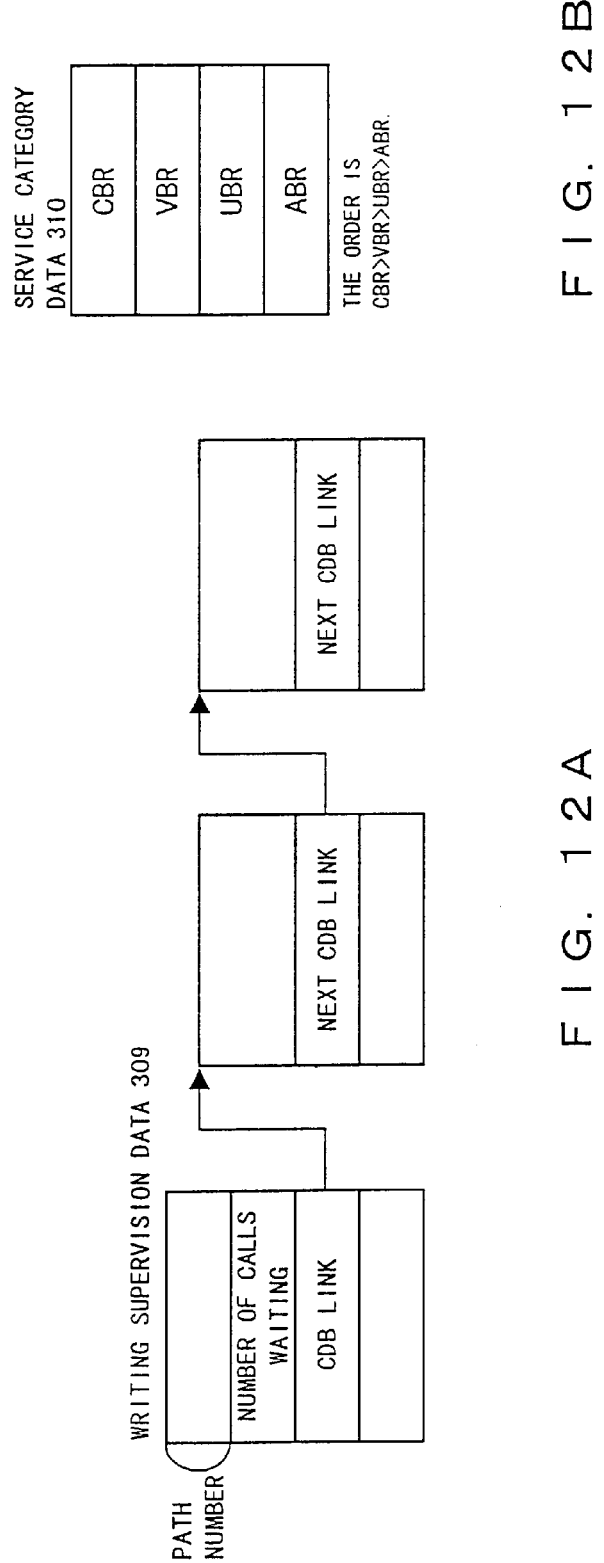

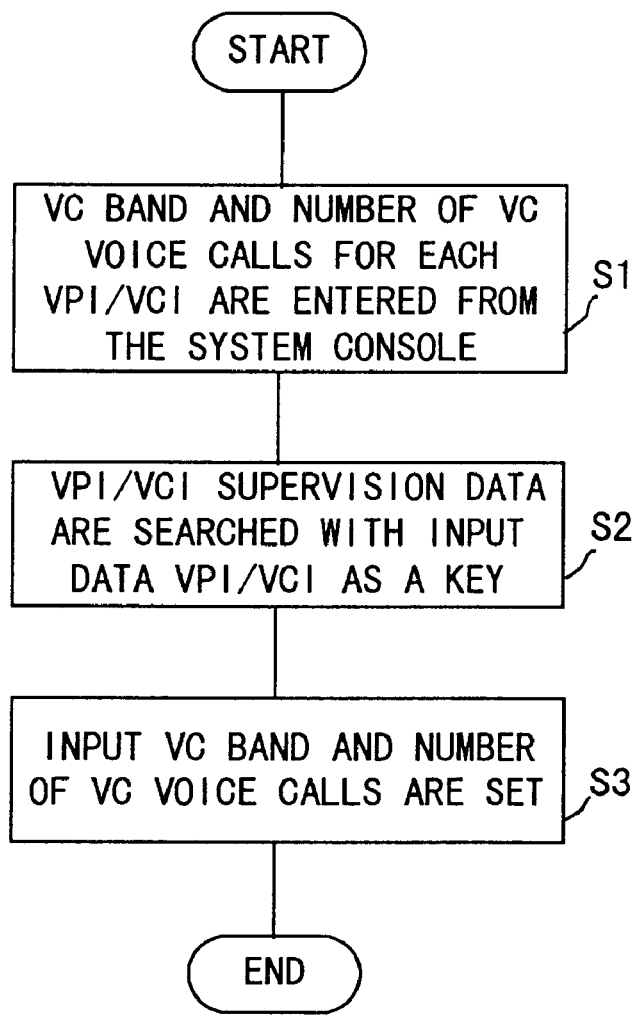
F I G. 1 3

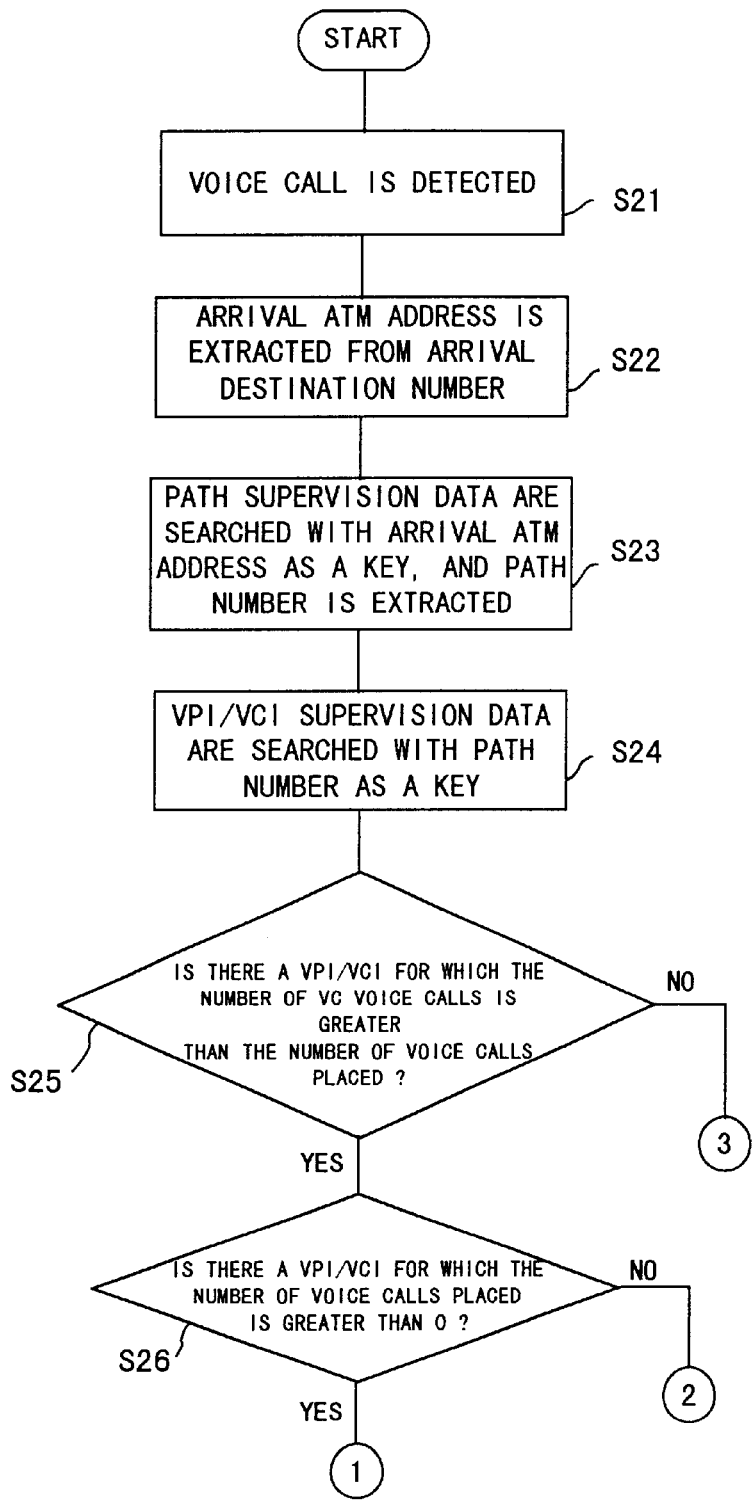
F I G. 15

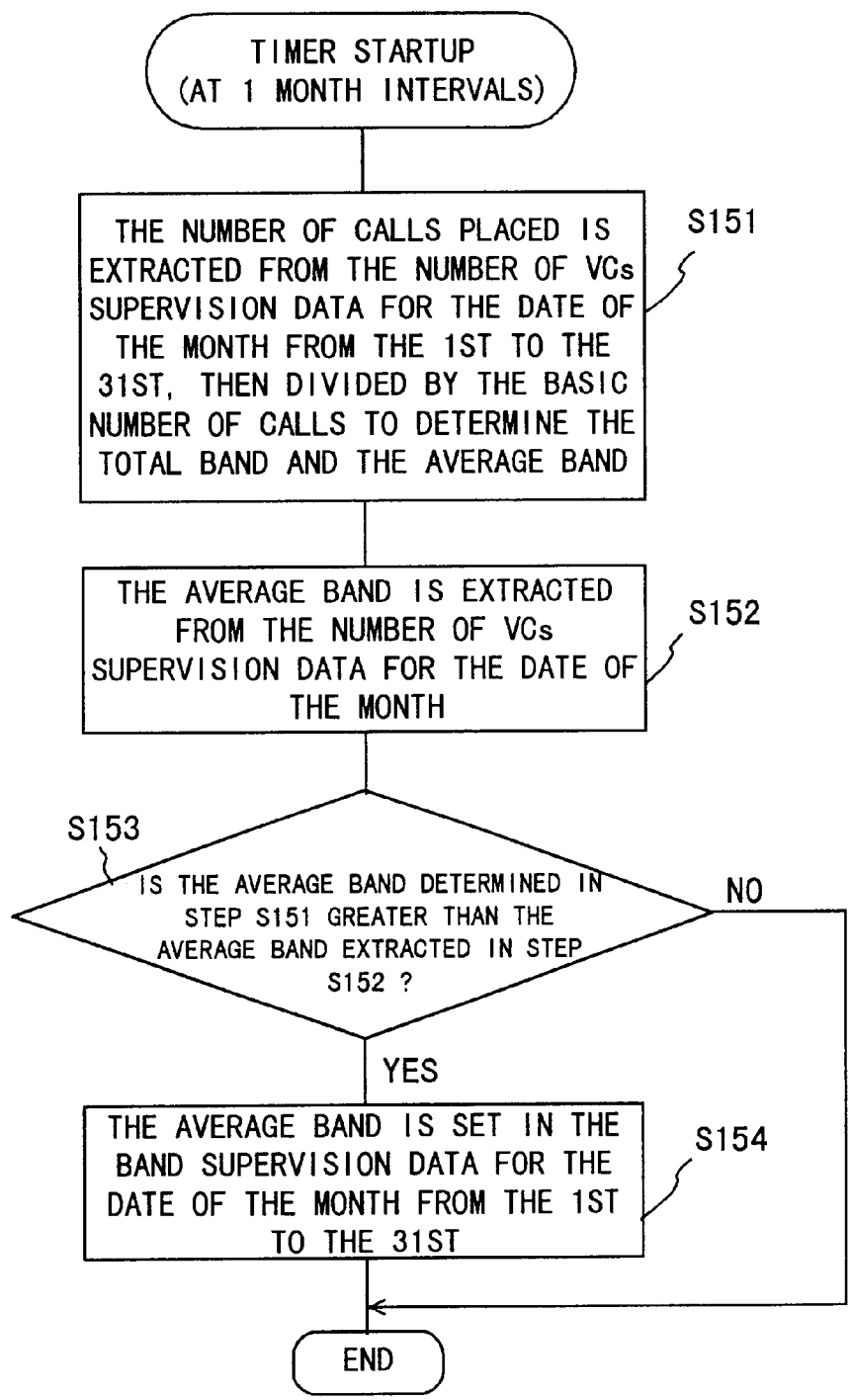
F I G. 30

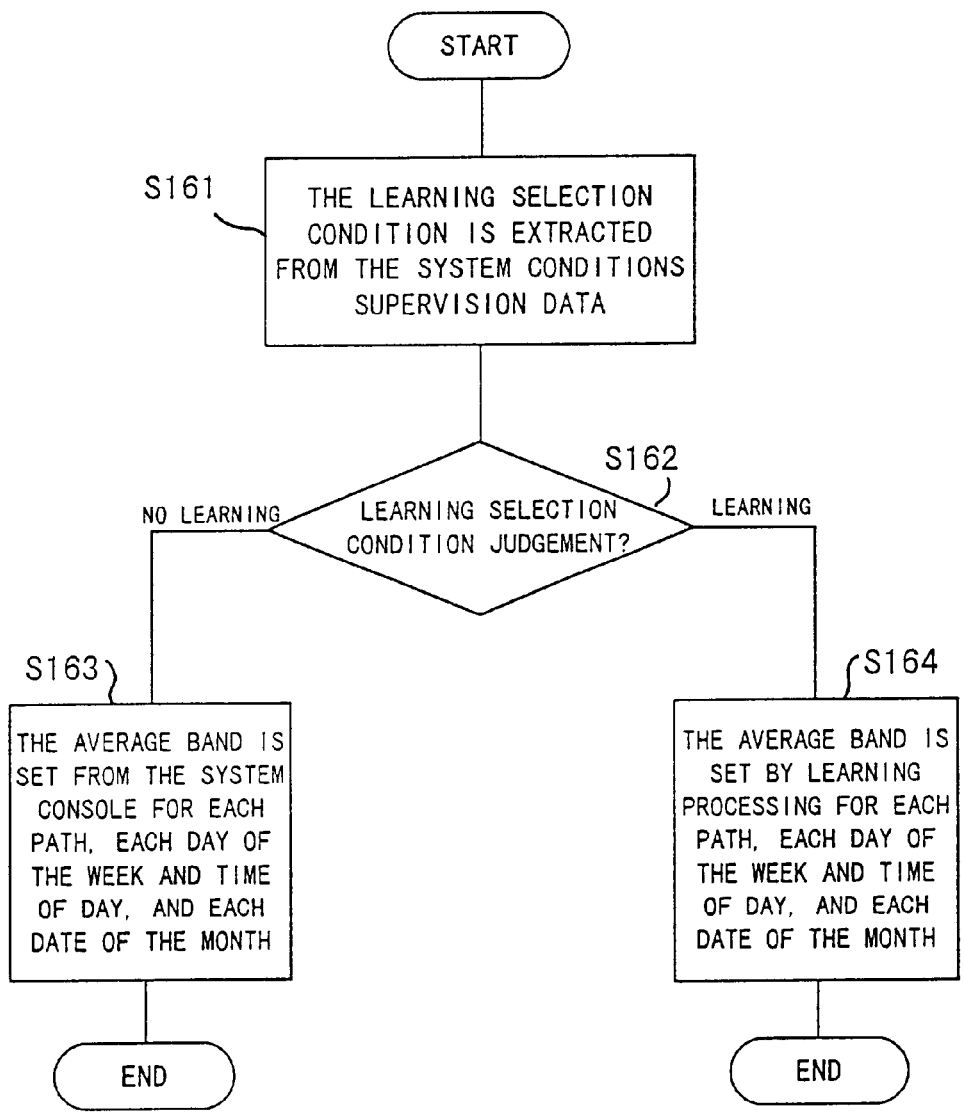
F I G. 3 1

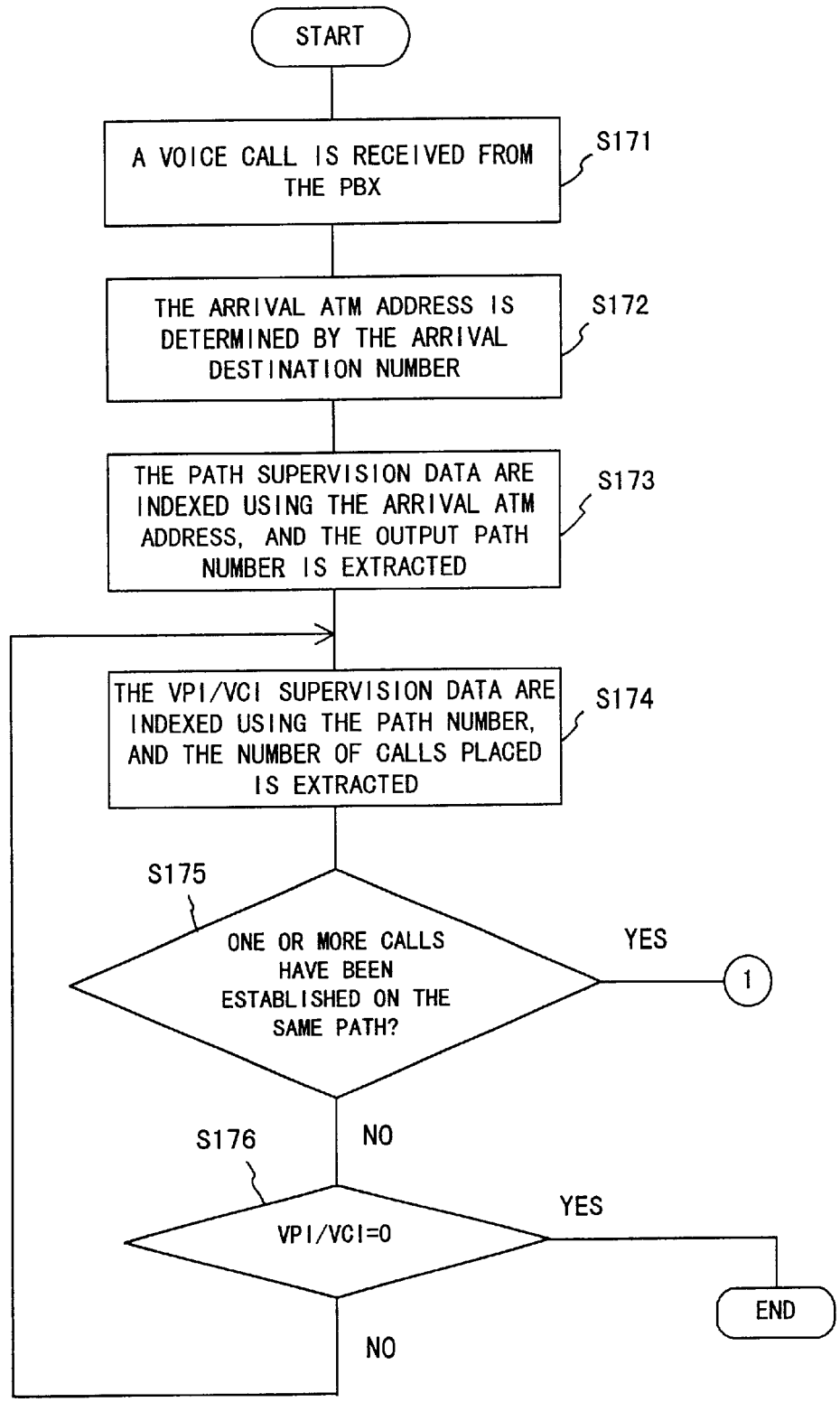
F I G. 3 2

| PATH NUMBER | | | USED/UNUSED FLAG |
|---|---|---|---|
| VPI/VCI 01 | CBR | 1 | |
| VPI/VCI 02 | CBR | 1 | |
| VPI/VCI 03 | CBR | 1 | |
| VPI/VCI 04 | CBR | 0 | |
| ⋮ | ⋮ | ⋮ | |
| VPI/VCI 33 | ABR | 0 | |
| VPI/VCI 34 | ABR | 0 | |
| ⋮ | ⋮ | ⋮ | |
| | | | |

F I G. 3 5

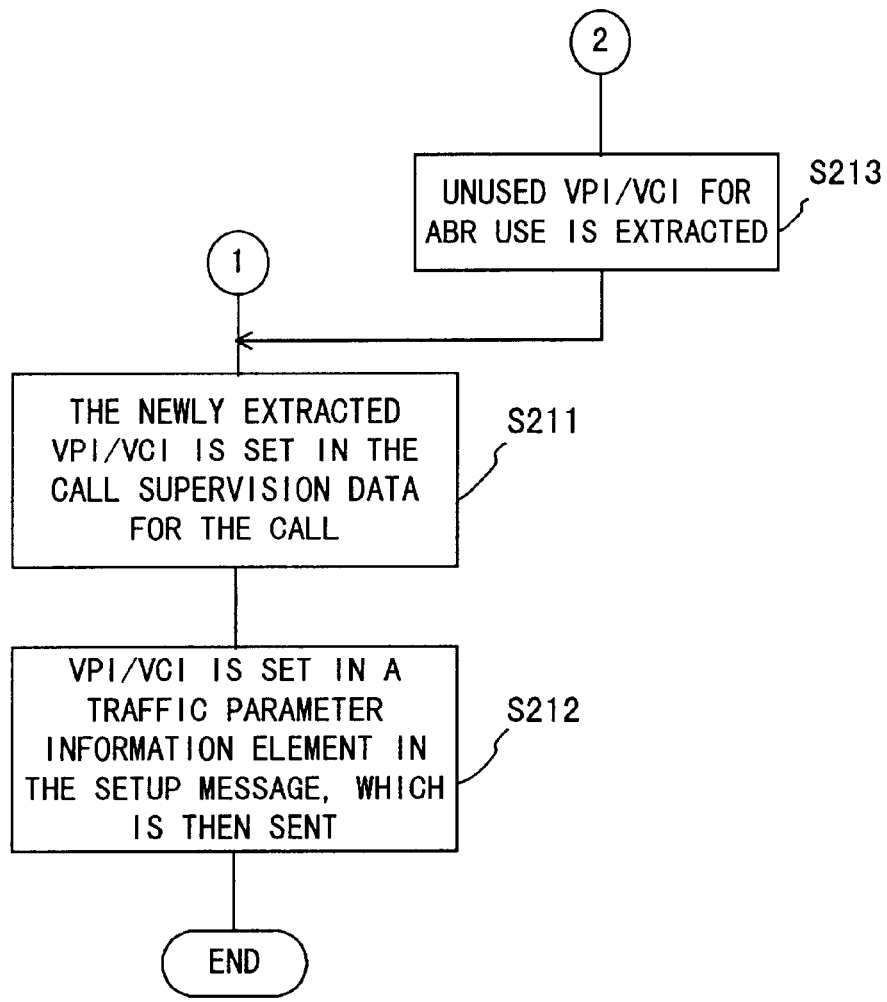
F I G. 3 7

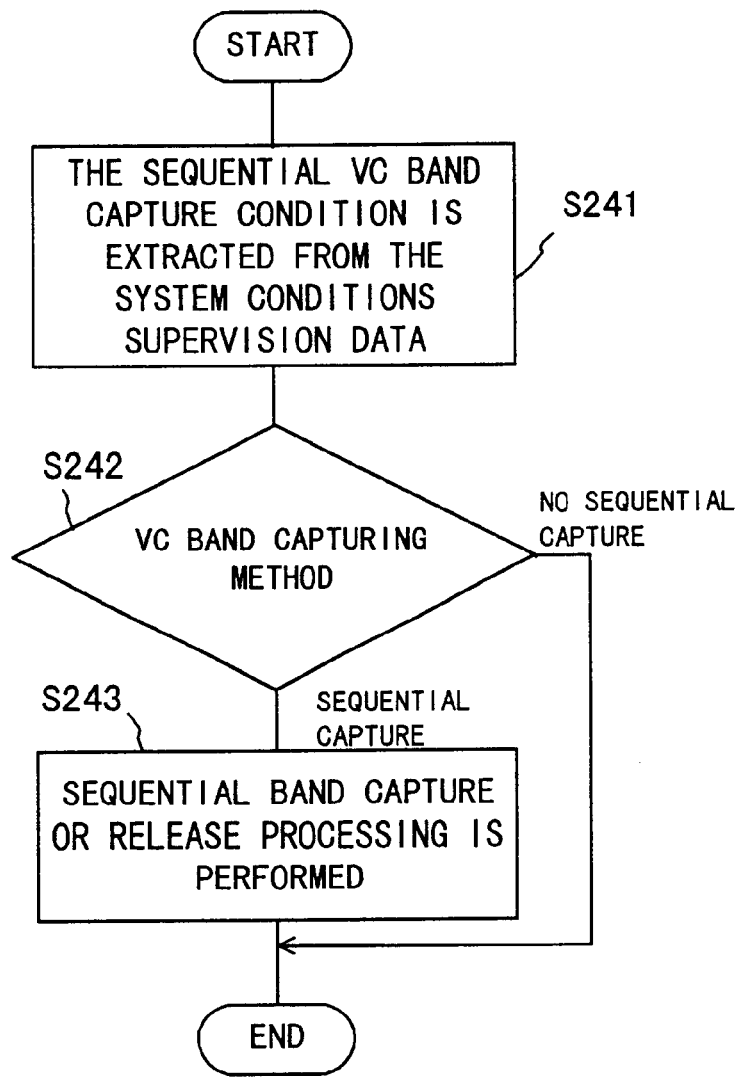
F I G. 3 9

FIG. 40A

| WIDE BAND TRANSMISSION CAPACITY | QOS PARAMETER | ATM TRAFFIC ELEMENT | CONNECTION IDENTIFIER | POSTING IDENTIFIER | PROCESS IDENTIFIER | USER – USER INFORMATION | ARRIVAL DESTINATION NUMBER |
|---|---|---|---|---|---|---|---|

FIG. 40B

| NUMBER OF SIGNALS VCs IN USE | NUMBER OF ORIGINATED CALLS IN PROCESS |
|---|---|

FIG. 40C

| USER – USER INFORMATION |
|---|

FIG. 40D

| OLD VPI/VCI | NEW VPI/VCI |
|---|---|

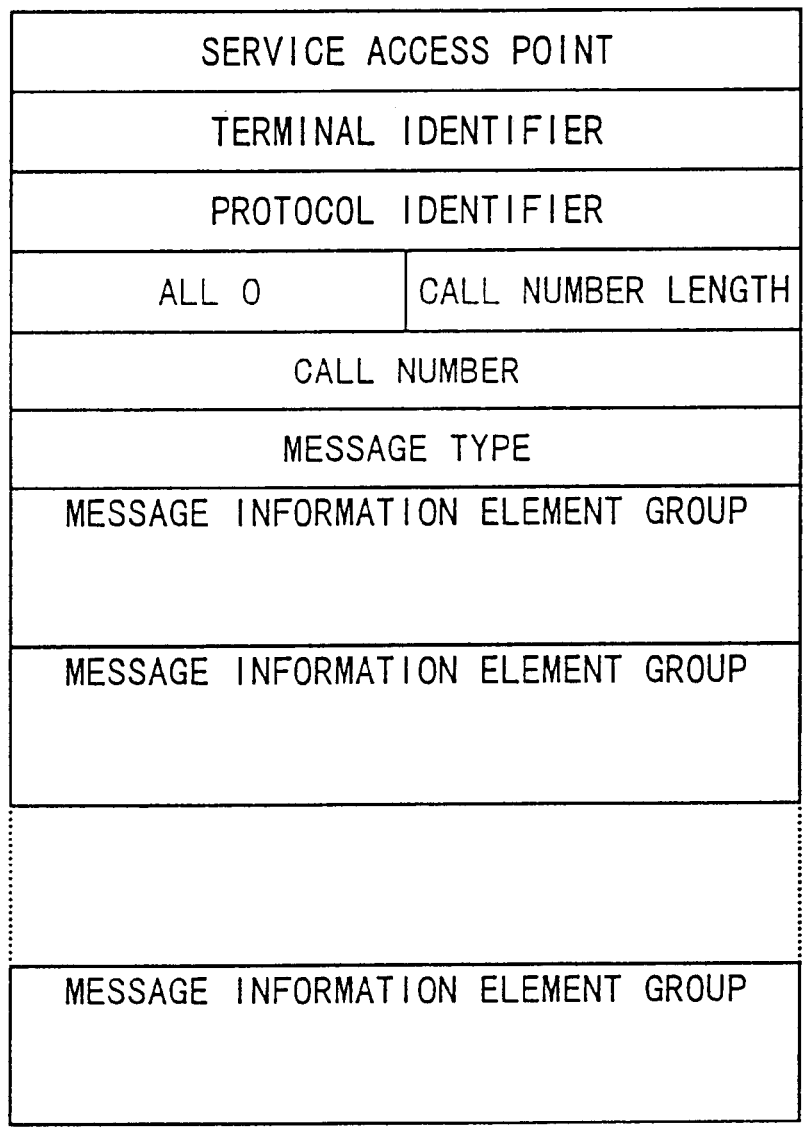
F I G. 4 1

DEVICE FOR CONTROLLING SIGNAL BANDS IN A PACKET NETWORK

BACKGROUND OF THE INVENTION

1. Field of the Invention

This invention relates to a device that controls bands assigned to signal channels in a packet network. In particular, it relates to an ATM multiplexing device that controls bands for virtual channels used for signalling in an ATM network.

2. Description of the Related Art

ATM is widespread as a core technology for making multimedia communication possible. In ATM, data are stored in fixed length packets called cells and transferred. A cell basically consists of a 5-byte header and a 48-byte payload. A VPI/VCI (Virtual Path Identifier/Virtual Channel Identifier) is set in the header as routing information for each cell. The information to be transferred is stored in the payload. For this reason, ATM is able to handle various types of data such as audio data, video data and text data in a unified manner. In addition, in ATM control data are also stored in the cells and transferred.

FIG. 1 is a configuration diagram of an existing ATM system. The ATM multiplexing nodes (AWNs) 501 and 502 each accommodate a PBX, data device, switching device, computer terminal, etc.; data received by them are multiplexed and sent to the ATM network, and, at the same time, cells received from the ATM network are transferred to the devices and terminals determined by the routing information in each cell.

In ATM, first a connection for the purpose of transferring data (a virtual connection) is established by signaling processing. Then the data are transferred through the connection that has been established. In the signaling processing, messages such as SETUP and CONNECT are used. Each of these messages is stored in one or more cells, and are transferred on the ATM network via Virtual Channels (referred to below as VCs) that are used for signals.

The VCs used for signals are normally fixed in advance for each path. In the example shown in FIG. 1, Virtual signal Paths (signal VPs) are fixed on the transmission path that connects ATM multiplexing nodes to one another; and a plurality of signal VCs are fixed on those signal VPs. In this case, a "path" is a transmission path that connects 2 points. For example, in a case in which 2 optical fibers are connected between device A and device B, those 2 optical fibers belong to the same path. However, in a case in which there are transmission paths connected between device A and device B, between device B and device C, and between device C and device A, even though it is possible to go from device A to device B either directly or via device C, those 2 paths are not called the same path.

The bands assigned to each signal VC can be decided upon arbitrarily when the system is constructed. In the example shown in FIG. 1, n kbps have been secured on the transmission path between the ATM multiplexing nodes 501 and 502 as the signal VC for a connection between PBXs. In an existing system, a typical signal VC band would be 64 kbps. It is also possible to perform signaling processing for a plurality of types of media using one signal VC. Standards for signal VCs are being considered by the ATM forum VTOA (STR-VTOA-LLT-01.12).

Let us now simply explain the signaling processing. Here, we show the case in which a call is placed from the telephone 503 to the telephone 506. When the telephone number of the telephone 506 is entered into the telephone 503, the PBX504 posts this number to the ATM multiplexing node 501. The ATM multiplexing node 501 creates a SETUP message in accordance with that number, and then transfers that message to the ATM multiplexing node 502 via the signal VC. The ATM multiplexing node 502 determines the virtual channel to be assigned to the connection between the telephone 503 and the telephone 506 in accordance with the received message, and then returns a response message to the ATM multiplexing node 501 via the signal VC. By this processing, information needed for connecting the telephone 503 to the telephone 506 is set in the ATM multiplexing nodes 501 and 502. Then the PBX 505 calls the telephone 506, to open a communication line between the telephone 503 and the telephone 506. The signal VC that is used to connect the telephone 503 to the telephone 506 is normally maintained, without being cut off, until the communication between the telephone 503 and the telephone 506 is completed.

Normally a signal VC can be shared by a plurality of calls. However, in an existing system, once the band (capacity) for each signal VC is first set, that band cannot be dynamically varied. Consequently, if the number of calls that are made at one time decreases, the amount of band capacity within the signal VC that is not being used increases. That is to say, the efficiency of band use decreases. In the example shown in FIG. 1, the amount of band capacity that has been assigned is enough to process s calls on the signal VC. In this case, if the number of calls that are made at one time is z (z<s), then enough band capacity for s−z calls is unused. This frequently happens, for example, late at night and on holidays.

Meanwhile, when the traffic, or number of calls made at one time, increases, cells are discarded. To avoid this discarding of cells, there is a function in the ATM network that delays the transfer of cells; it is necessary to prevent the transmission rate from exceeding the maximum band capacity of that signal VP by averaging the time between sending of cells that transmit information needed for signaling. However, it is desirable for such delays to be kept as small as possible.

Thus, in an existing type of ATM multiplexing node, it has not been possible for the band capacity of a signal VC to be dynamically varied, causing the efficiency of use of band capacity to decrease, or causing cells to be discarded or delays to occur.

SUMMARY OF THE INVENTION

This invention solves the problem described above. It provides a device that can efficiently use band capacity for the signal channel in a packet network.

The signal band control device of this invention presupposes a configuration that controls band capacity assigned to a signal channel in a packet network that transfers fixed length packets, and has the following means to do this.

Detecting means for detecting a call origination and a release of a call. Capturing means for capturing a signal channel based on the detection of a call origination by the detecting means. Releasing means for releasing a signal channel based on the detection of a release of a call by the detecting means.

In the configuration described above, the capturing means secures the smallest necessary signal band for each call origination. The releasing means releases the unnecessary band when it is no longer needed for the signal. For this reason, the amount of wasted band is decreased, which makes for efficient use of band capacity.

In addition to the basic configuration described above, reassignment means for, if the number of calls assigned to a first signal channel drops below a predetermined threshold, assigning a call that had been assigned to that first signal channel to a second signal channel may be provided, so that the releasing means can release the first signal channel. In this kind of configuration, in a case in which the number of calls assigned to a certain signal VC (the old VC) is small, those calls are assigned to another-signal VC, and the old VC is released. For this reason, the band capacity that had been assigned to the old VC can be assigned to another medium, making for efficient use of band capacity.

In addition to the basic configuration described above, learning means for monitoring communication conditions under certain predetermined condition and establishing means for establishing a signal channel that has a band corresponding to the communication conditions detected by the learning means under the predetermined condition may be provided. In this kind of configuration, it is possible to automatically set signal bands in accordance with the communication condition monitored using the learning means, decreasing the amount of work involved in supervising band operation.

BRIEF DESCRIPTION OF THE DRAWINGS

FIG. 8A shows a diagram explaining the path supervision data;

FIG. 8B shows a diagram explaining the band supervision data;

FIG. 9A shows a diagram explaining the VPI/VCI supervision data;

FIG. 9B shows a diagram explaining the system condition supervision data;

FIG. 10A shows a figure explaining supervision of data on number of VCs according to the day of the week;

FIG. 10B shows a figure explaining supervision of data on number of VCs according to the date;

FIG. 12A shows a figure explaining the wait supervision data;

FIG. 12B shows a figure explaining the service category data;

FIG. 13 is a flowchart of initial settings of bands for each signal VC;

FIG. 15 is a flowchart (1 of 2) of the processing to capture a signal VC;

FIG. 30 is a flowchart of the learning processing for each date;

FIG. 31 is a flowchart of the learning selection processing;

FIG. 32 is a flowchart (1 of 2) of the processing to avoid duplicate capture of a signal band;

FIG. 35 shows a configuration diagram of the VPI/VCI supervision table;

FIG. 37 is a flowchart (2 of 2) of the processing to switch service categories;

FIG. 39 is a flowchart of the processing to select the band capture method;

FIG. 40A shows the format of a SETUP message;

FIG. 40B shows information stored in the SETUP message user—user information;

FIG. 40C shows the format of an INFO message;

FIG. 40D shows information stored in the INFO message user—user information; and FIG. 41 shows the format of an ISDN message frame.

DETAILED DESCRIPTION OF THE INVENTION

This invention can be widely used in devices to control bands assigned to signal channels in a packet network, especially a packet network that transfers fixed length packets, but in the discussion below, we will consider ATM as an embodiment, and explain the invention for the case of an ATM multiplexing node that has the function of controlling bands assigned to virtual signal channels.

Figure 1:
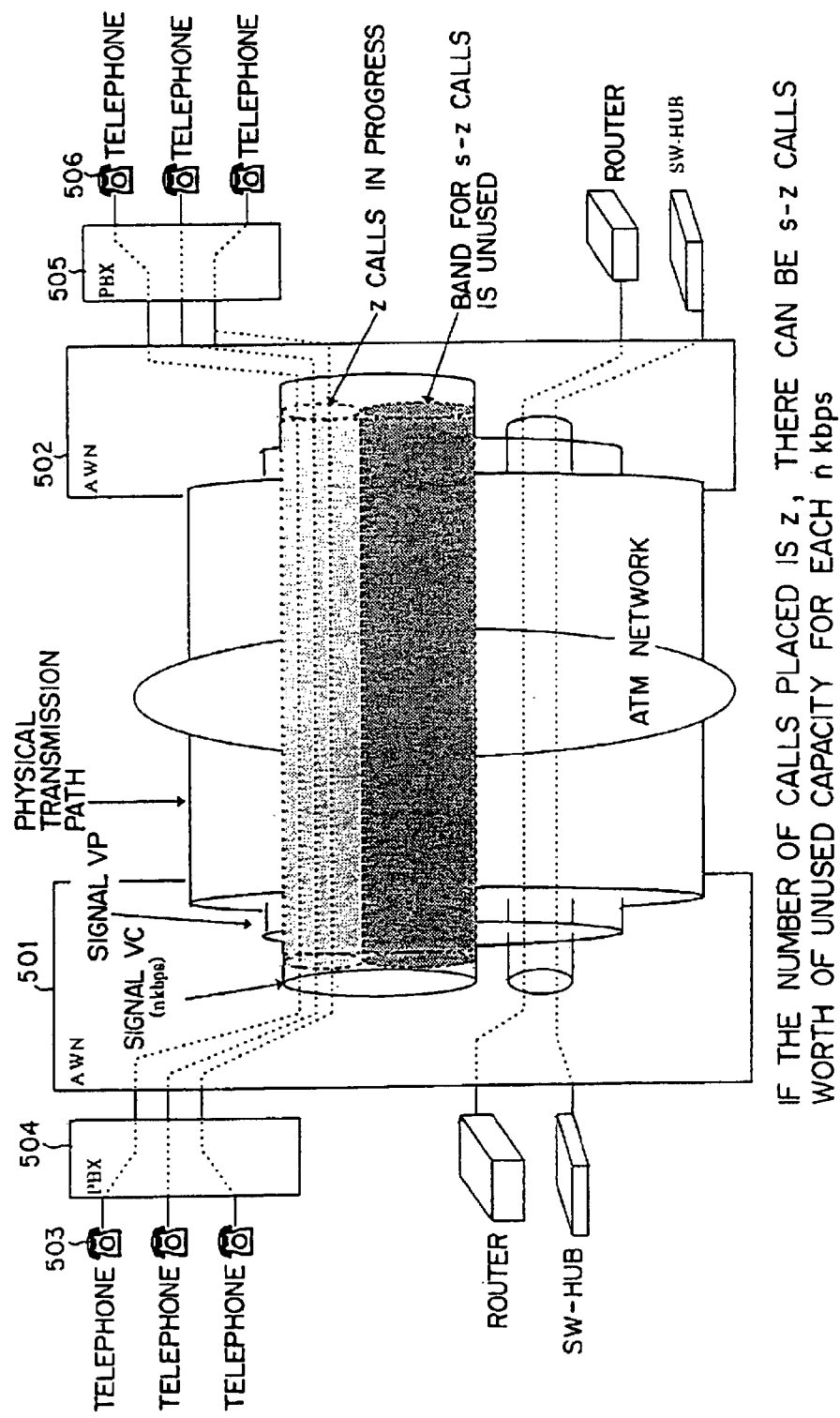
FIG. 1 is a configuration diagram of an existing ATM system.
Figure 2:
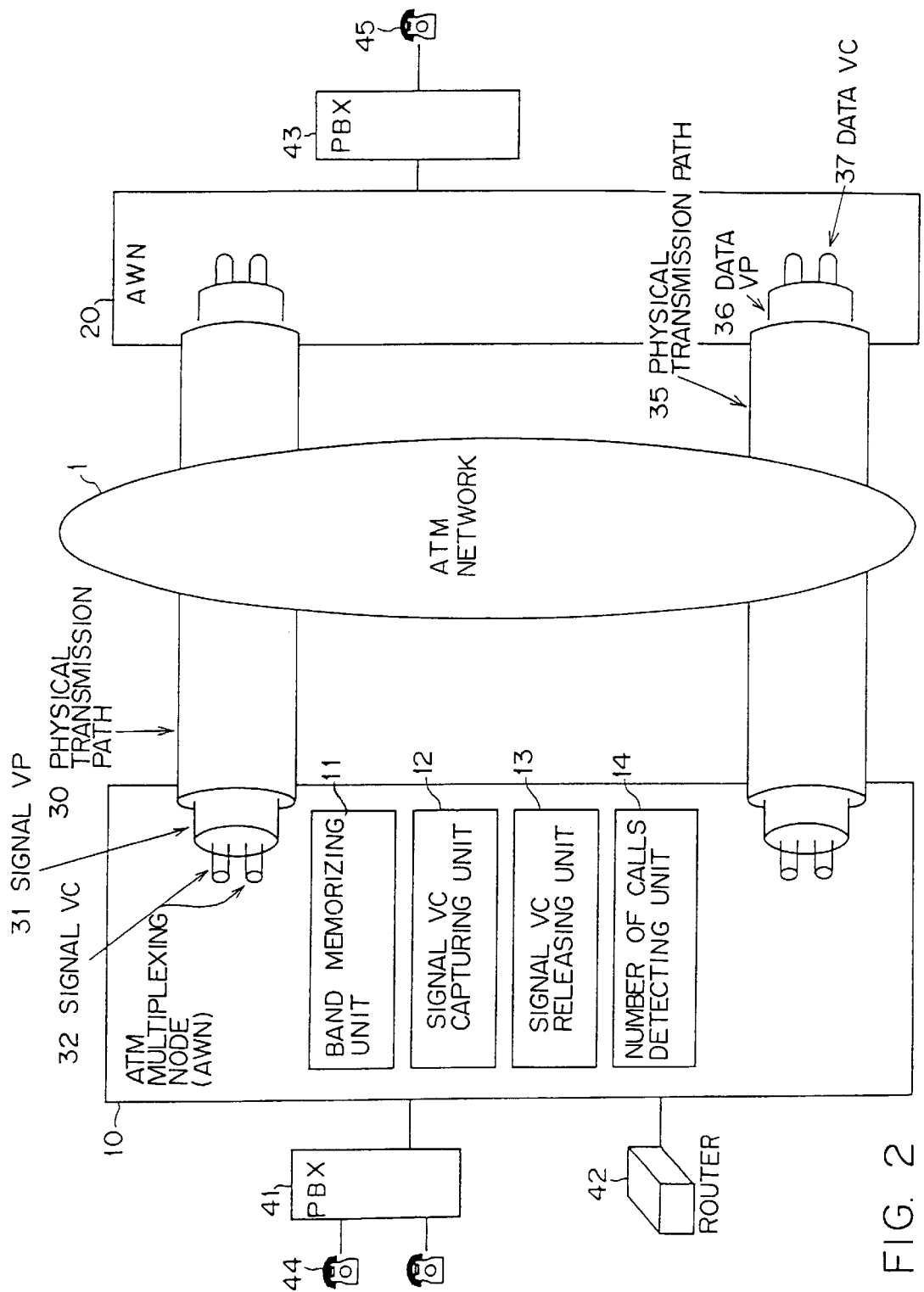
FIG. 2 shows the principle of this invention.

FIG. 2 shows the principle of this invention. The ATM multiplexing node 10 accommodates the PBX41, the router device 42, etc., and multiplexes the data received from them and sends the data to the ATM network 1; and, at the same time, transfers data stored in cells received from the ATM network 1 to the device (the PBX41, the router device 42, etc.) determined in accordance with the routing information of each cell.

The ATM multiplexing node 10 is connected to other ATM multiplexing nodes via the ATM network 1. Here, the ATM multiplexing node 10 is connected to the ATM multiplexing node 20 by the transmission paths 30 and 35. A signal VP (a virtual path used for signals) 31, which transmits cells that store control data such as signaling messages, is established in the transmission path 30; and a signal VC (virtual channel used for signals) 32 is established in that signal VP 31. The data VP (virtual path used for data) 36, which transmits cells in which, for example, communication data are stored, is established in the transmission path 35; and the data VC (virtual channel used for data) 37 is established within that data VP 36. Note that in FIG. 2, the transmission path 30 and the transmission path 35 are shown as being established in different physical transmission lines, but normally signal VPs and data VCs are established in the same physical lines.

Each ATM multiplexing node has, respectively, a band memorizing unit 11, a signal VC capturing unit 12, a signal VC releasing unit 13 and a number of calls detecting unit 14. The band memorizing unit 11 is a memory that stores parameters related to the bands that are used as the signal VCs for each path. When the number of simultaneous calls in a given path increases, the signal VC capturing unit 12 captures a new signal VC in that path. Conversely, when the number of calls that exist simultaneously in a given path decreases, the signal VC releasing unit 13 gradually releases signal VCs in that path. The number of calls detecting unit 14 counts the number of calls in each path based on detection of calls captured and detection of calls that are released.

Figure 3:
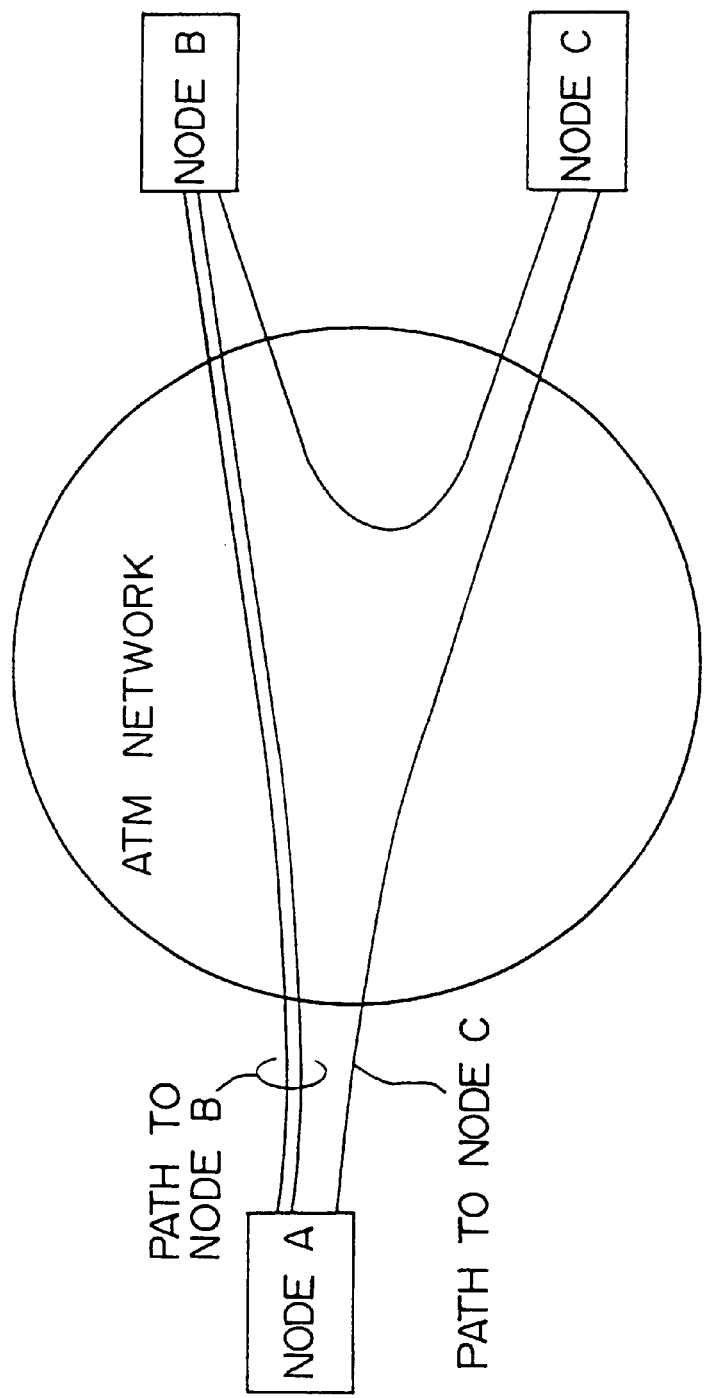
FIG. 3 shows a figure explaining the concept of a path.

Here, let us explain what is meant by a "path". A "path" as used here is a transmission path that connects 2 points; the path leading to each destination as seen from a point. Consequently, if the nodes A, B and C in FIG. 3 are connected to one another, at node A there exist "the path that is connected to node B" and "the path that is connected to node C". Here, if, for example, there are 2 optical fibers connected between node A and node B, those 2 optical fibers belong to the same path. It is not necessary for a path to consist of a physical wire; it could also be a wireless line.

Returning to FIG. 2, let us now explain the action of an ATM multiplexing node, centering on the functions of each of the units 11 to 14. Here, we consider the case in which a call is placed from the telephone 44 in the PBX 41 to the telephone 45 in the PBX 43.

In addition to the bands used as signal VCs for each of the paths, the bands of each of the signal VCs established in each path, and the numbers of calls assigned to the specified bands, are set in the band memorizing unit 11. That is to say, essentially the numbers of calls assigned to each of the signal VCs are set in the band memorizing unit 11.

When a call from the telephone 44 to the telephone 45 is detected, the ATM multiplexing node 10 recognizes the ATM multiplexing node (the ATM multiplexing node 20) which accommodates the destination. The number of calls detecting unit 14 investigates the respective numbers of calls that exist on each of the signal VCs established in the path connected to the ATM multiplexing node 20, and searches for a signal VC that has unused band capacity. If a signal VC that has unused band capacity is found, the call that is detected is assigned to that signal VC. On the other hand, if a signal VC with unused band capacity is not found, the signal VC capturing unit 12 establishes (captures) a new signal VC, and the detected call is assigned to that newly established signal VC. Thus, when a call is detected, the ATM multiplexing node 10 captures a new signal VC as necessary.

Signaling processing, that is to say the processing that establishes a data VC that receives messages between ATM multiplexing nodes via a signal VC, is the same as in previously existing systems, so its explanation is omitted here.

When communication between the telephone 44 and the telephone 45 is completed, the call that corresponds to that conversation is deleted (released) from the signal VC used to send and receive messages related to that conversation. Then the number of calls detecting unit 14 decrements the number of calls that exist on that signal VC by "1". If this action results in the number of calls that exist on that signal VC being "0", then the signal VC releasing unit 13 releases that signal VC. Thus, when a call is released (when a call is completed), the ATM multiplexing node 10 releases the signal VC as necessary.

As explained above, an ATM multiplexing node in this embodiment has the function of dynamically changing the band assigned to a signal VC as necessary. Consequently, if the number of calls that exist simultaneously decreases, the signal VC is released to decrease the amount of waste in use of band capacity. If, on the other hand, the number of calls that exist simultaneously increases, additional VCs are captured so that discarding of cells and delays can be avoided. Here, if the amount of signal VC band that is captured or released at one time by the signal VC capturing unit 12 and the signal VC releasing unit 13 is made-sufficiently small, the band capacity can be finely adjusted, decreasing the waste in use of band capacity.

Figure 4:
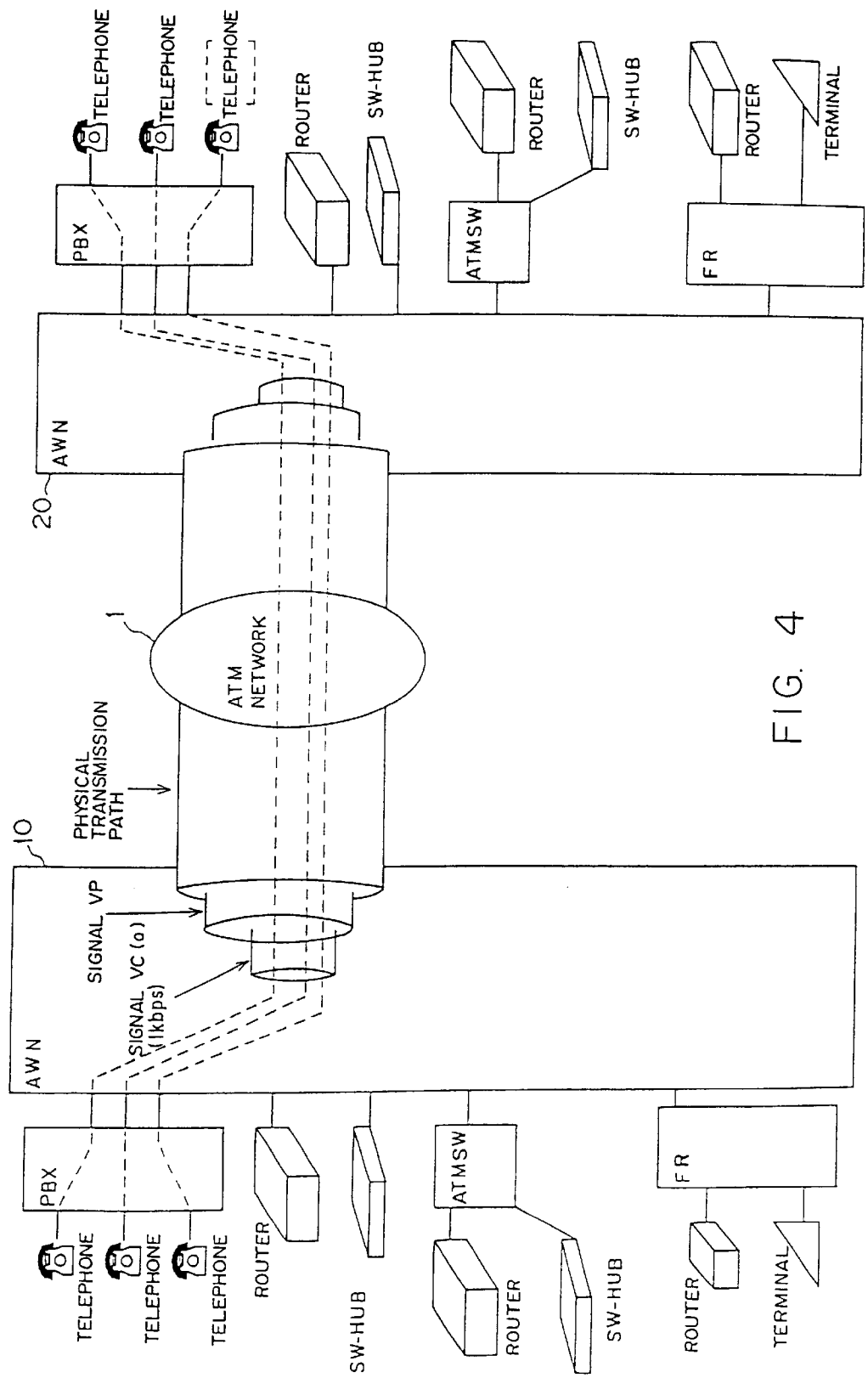
FIG. 4 shows a diagram schematically showing the action of an ATM multiplexing node (when there are few calls)
Figure 5:
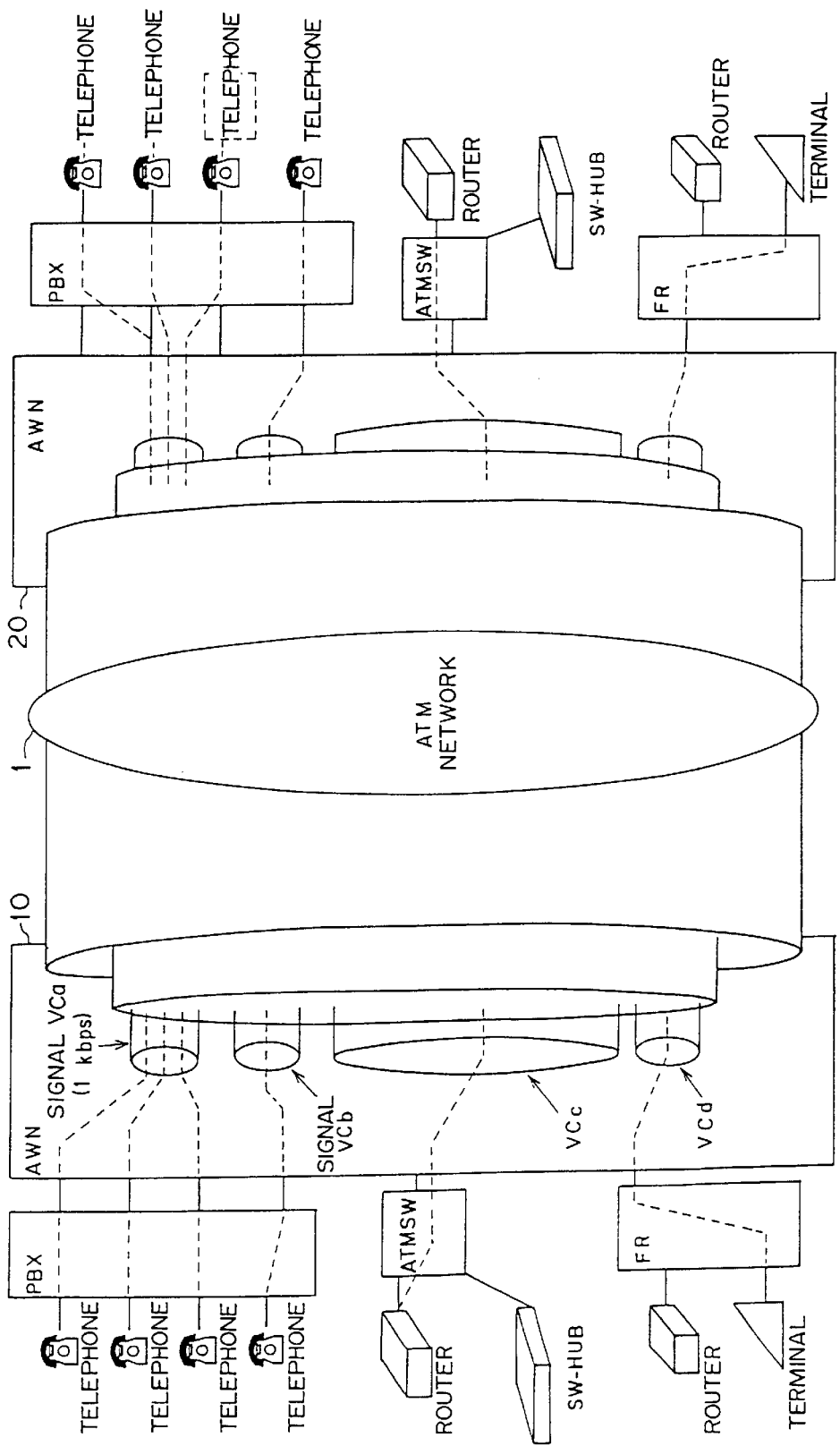
FIG. 5 shows a diagram schematically showing the action of an ATM multiplexing node (when there are many calls)

FIG. 4 and FIG. 5 schematically show the action of an ATM multiplexing node of this embodiment. Here, each signal VC band is taken to be 1 kbps, and 3 calls can be assigned to 1 kbps, for example. Note that in signaling processing, the amount of data being transferred increases while a message is being transferred, but at other times the amount of data being transferred is small. Consequently, it is difficult to accurately determine the minimum band that is necessary to transfer the signaling data for each call. In this embodiment, as one example, the amount of band necessary to transfer the signaling data for one call is "estimated" to be ⅓ kbps, so that 3 calls are assigned to 1 kbps.

When the number of calls that exist simultaneously in the same path in an ATM multiplexing node is 3 or less, then, as shown in FIG. 4, one signal VC (VCa) is established on that path, so that the control signals related to those calls are transmitted via that signal VC (VCa).

When the number of calls that exist simultaneously increases, then as shown in FIG. 5, the number of signal VCs on that path is increased by newly capturing another signal VC (VCb). The band of this newly captured signal VC is also 1 kbps, for example. Thus, by making the band of each signal VC sufficiently small and establishing only minimum number of signal VCs that are necessary, the amount of unused band capacity is kept to a minimum, and the bands that can be used by other media are increased.

In the previously existing configuration, prefixed large bands (for example, 64 kbps) were assigned as signal VCs for voice calls. For this reason, even when the number of voice calls was small, the bands that were assigned for voice calls could not be used by other media, leading to large amounts of unused band capacity. In the configuration of this embodiment, this problem has been solved.

Note that in FIG. 4 and FIG. 5, the band for each signal VC is taken to be 1 kbps, but the value is not necessarily limited to this. In addition, in the example described above, the number of calls assigned to a unit band was taken to be "3", but this number also can be arbitrarily set.

Figure 6:
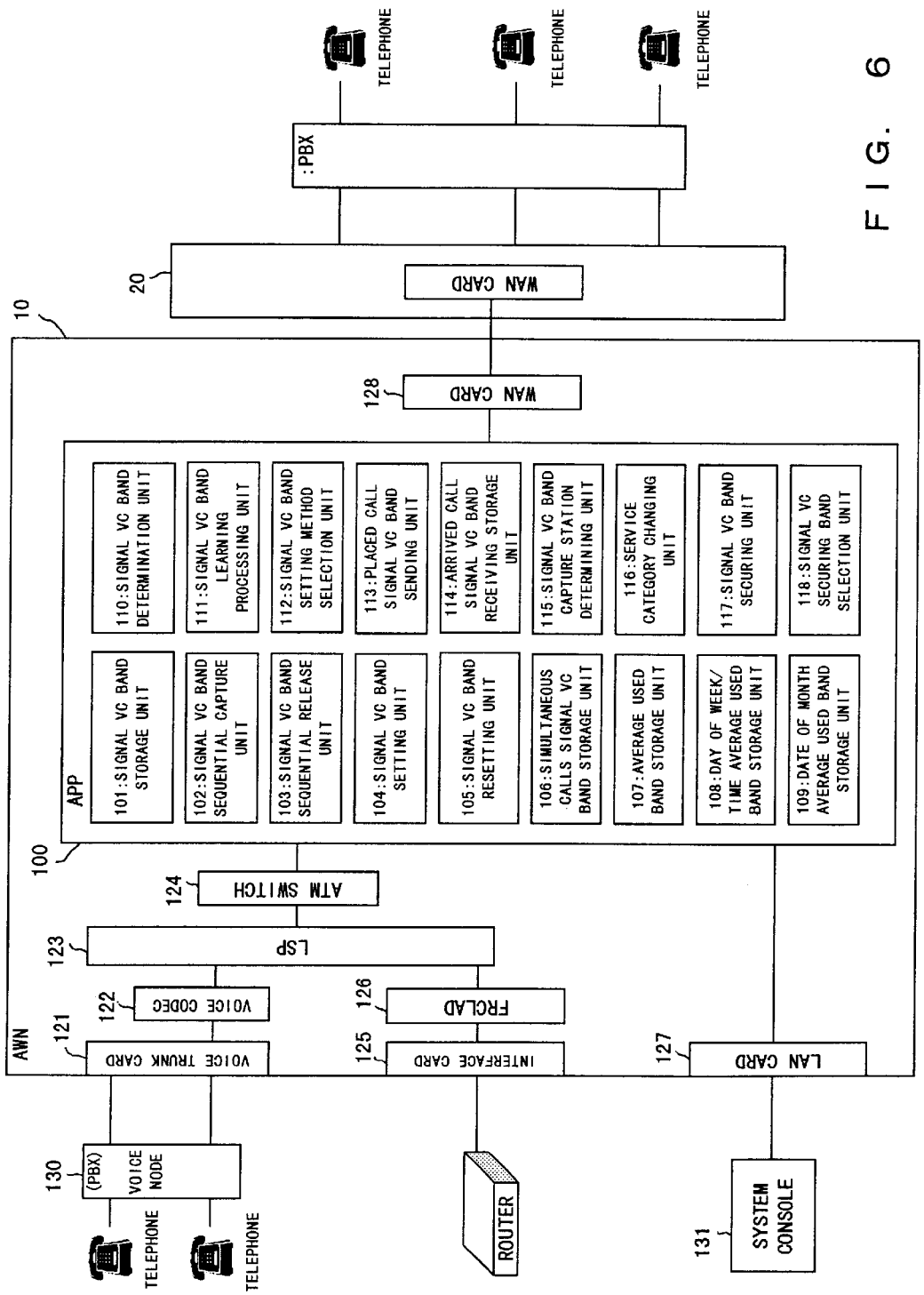
FIG. 6 shows a configuration of this embodiment.

FIG. 6 is a configuration diagram of this embodiment. The ATM multiplexing node (AWN) 10 accommodates the voice node (PBX) 130 via the voice trunk card 121, and accommodates a router, etc., via the interface card 125. The voice node 130 is connected to the ATM multiplexing node 10 by an ISDN interface or an analogue interface. In addition, the system console 131 is connected to the ATM multiplexing node 10 via the LAN card 127. Further, the ATM multiplexing node 10 is connected to other ATM multiplexing nodes via the WAN card 128.

The voice CODEC 122 encrypts and decrypts data that are input and output via the voice trunk card 121. The FRCLAD 126 assembles and disassembles cells as data are input and output through the interface card 125. The Line Set Processor (LSP) 123 terminates each of the lines, detects the source and destination of received data, interprets messages, etc. The Line Set Processor 123 also assembles and disassembles cells as necessary. The ATM switch 124 sends each cell to the path determined on the basis of routing information set in the cell's header. These devices are already available as existing technology.

The APplication Processor (APP) 100 is a new device introduced in this embodiment. It dynamically controls the signal bands of each path connected to the ATM multiplexing node 10 to respond to a variety of factors. The Application Processor 100 includes a CPU and memory, and consists of the following units 101 to 118.

The signal VC band storage unit 101 store the bands used for the purpose of transmitting the signaling data for each path, the bands for each signal VC, etc. When the number of calls existing in a given path at one time increases, the signal VC band sequential capture unit 102 captures a new band to be used as a signal VC in that path. Conversely, when the number of calls existing in a given path at one time decreases, the signal VC band sequential release unit 103 sequentially releases bands that are being used as signal VCs in that path.

Figure 17:
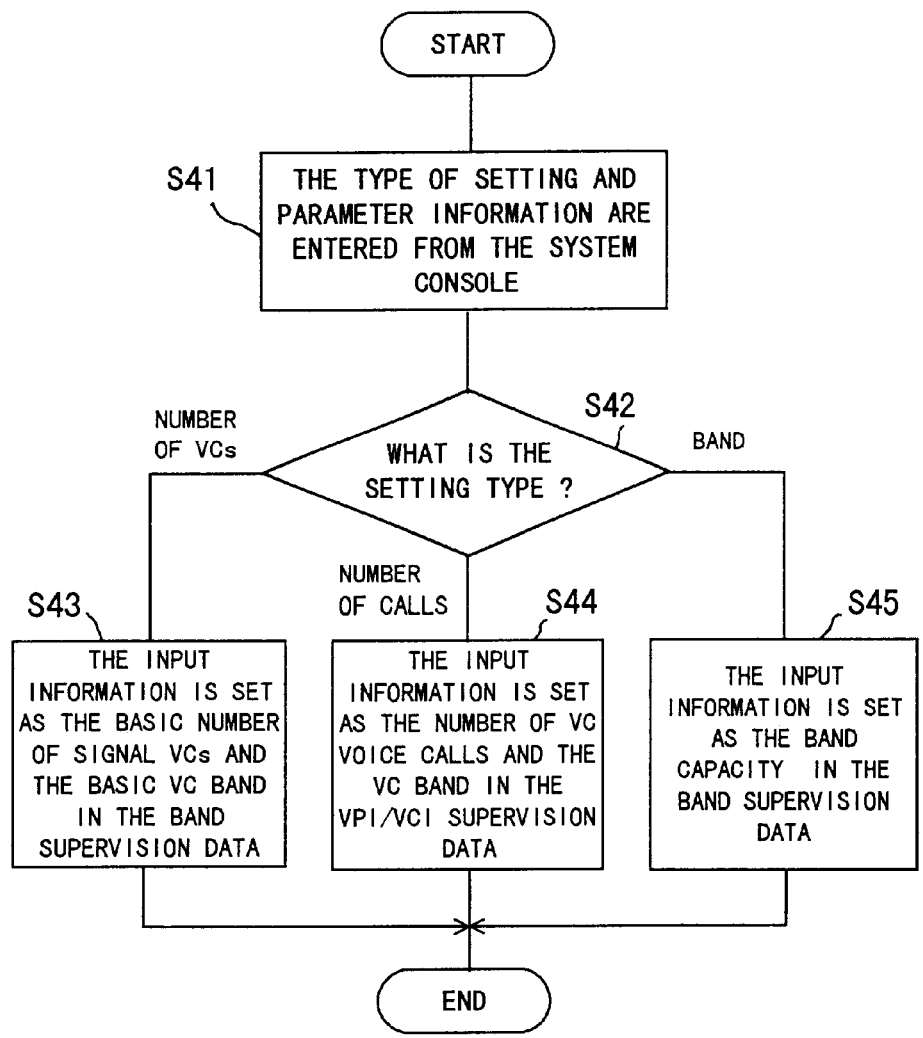
FIG. 17 is a flowchart of the processing to set the band capacity to be used as the signal VC for each path.

The signal VC band setting unit 104 receives band setting information that is sent from the system console 131, and sets it in the signal VC band storage unit 101 (see FIG. 17). When the number of calls in a certain signal VC becomes less than a specified number, the signal VC band resetting unit 105 releases the signal VC by assigning the remaining calls to another signal VC (see FIGS. 18 and 19). If a plurality of calls are made simultaneously, the simultaneous calls signal VC band storage unit 106 captures additional bands to be used as the signal VCs for those calls (see FIG. 20). The average used band storage unit 107 stores average bands to be used as signal VCs for each path (see FIG. 21). The day of week-time average used band storage unit 108 stores the average bands to be used as signal VCs for each path and for each day of the week and time (see FIGS. 23 and 24). The date average used band storage unit 109 stores the average bands used as signal VCs for each path and each date (see FIGS. 25 and 26). The data stored in the units 107 to 109 are input by the user from the system console 131.

The signal VC band determination unit 110 reads out the band data stored in the units 107 to 109 according to conditions; these data are then used in the signal VC band learning processing unit 111. The signal VC band learning processing unit 111 detects the number of calls that have actually been made, then, with this detected value as a learning datum, updates the band data received from the signal VC band determination unit 110 (see FIGS. 28 to 30). The signal VC band setting method selection unit 112 is used by the user to select either preset band data or the band data obtained by learning processing (see FIG. 31).

The placed call signal VC band sending unit 113 detects the numbers of calls that exist in each path, and posts the numbers of calls that exist in the originating node to the destination nodes to which each path is connected. The arrived call signal VC band receiving storage unit 114 stores the number of calls received from the placed call signal VC band sending units 113 of other nodes. The signal VC band capture station determination unit 115 determines the numbers of calls that currently exist in each path from the number of calls detected by the placed call signal VC band sending unit 113 and the number of calls received by the arrived call signal VC band receiving storage unit 114 (for the units 113 to 115, see FIGS. 32 to 34).

Figure 36:
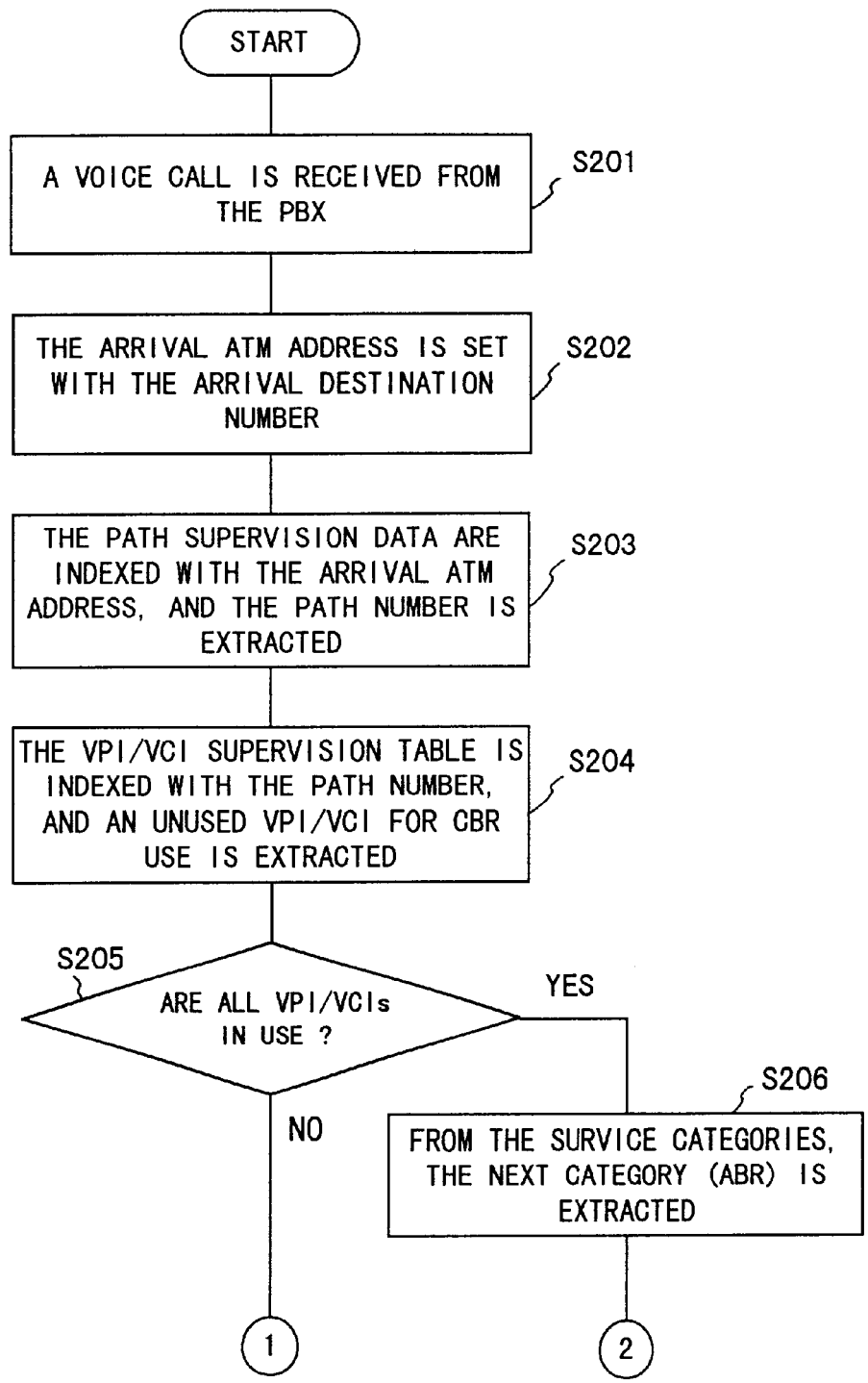
FIG. 36 is a flowchart (1 of 2) of the processing to switch service categories.

When a sufficient number of signal VCs for the number of calls that have been made cannot be captured, the service category changing unit 116 establishes signal VCs in another communication service category and transfers signaling data (FIGS. 35 to 37). To prepare for the possibility that the number of calls will increase, the signal VC band securing unit 117 secures a band large enough to handle voice calls which are detected (see FIG. 38). When the number of calls increases or decreases, the signal VC securing band selection unit 118 indicates whether or not signal. VCs are to be captured or released to the signal VC band sequential capture unit 102 and the signal VC band sequential release unit 103 (see FIG. 39).

Let us now explain details of the specific processing in the units 101 to 118, referring to flowcharts to be presented.

Figure 7:
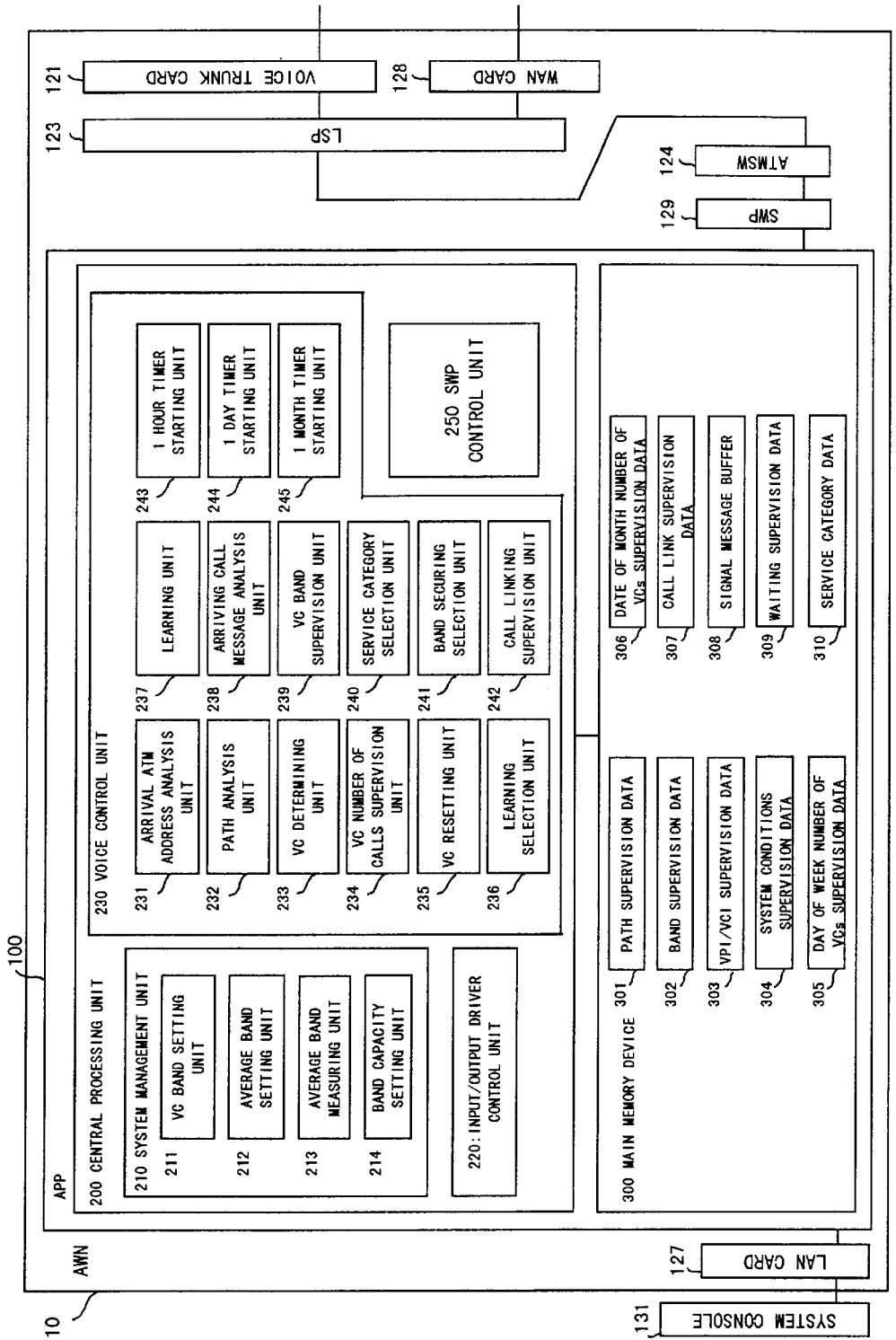
FIG. 7 shows a functional block diagram of the signal band control device of this embodiment.

FIG. 7 is a functional block diagram of the device (the signal band control device) that is installed in the ATM multiplexing node of this embodiment and dynamically controls the signal band in accordance with a variety of factors. The signal band control device in this case is the APplication Processor (APP) 100 shown in FIG. 6.

The Application Processor 100 consists of the CPU (Central Processing Unit) 200 and the main memory device 300. The CPU 200 has a system management unit 210, an input/output driver control unit 220, a voice control unit 230 and a switch processor control unit 250. The functions and actions of the respective units that comprise the system management unit 210 and the voice control unit 230 will be explained in detail with reference to the flowcharts to be presented below. Note that these units are realized by execution of the programs that describe the processing in the flowcharts to be presented below. The data stored in the main memory device 300 will be explained in detail referring to FIGS. 8 to 12.

FIG. 8A explains the path supervision data 301. The path supervision data 301 include a number (the path number) that identifies the path that goes to the node that accommodates the terminal in which the ATM address is stored, and is stored as a key to the ATM address. For example, in the path supervision data in node A in FIG. 3, the path number that is stored as the key to the ATM address of the terminal that is accommodated by node B is the number that identifies the path to node B. Consequently, when the ATM multiplexing node 10 receives a setup message, the path on which that message is to be sent can be identified by detection of the ATM address from the destination set in that message. This processing is executed by the arrival ATM address analysis unit 231 in FIG. 7. Note that the path supervision data 301 are registered by the system console 131.

FIG. 8B is a diagram to explain the band supervision data 302. The band supervision data 302 include data relating to each path, as keys to the path numbers. The "number of basic signal VCs" is the number of signal VCs that can be established in each path. The "basic number of calls" is the number of voice calls assigned to a unit band (1 kbps) in the corresponding path. As one example, consider the case in which the basic number of calls is 3 calls/kbps. This value is obtained by estimating ⅓ kbps as the average value of the band needed to transmit the signaling data for each voice call. The "basic VC band" is the band assigned to 1 signal VC in the corresponding path. As an example, consider the case in which the basic VC band is 1 kbps/vc. Note that if the basic number of calls is 3 calls/kbps and the basic VC band is 1 kbps/vc, then 3 voice calls are assigned to each signal VC.

The "band capacity" is the amount of band assigned for the purpose of signaling of voice calls in each path. When the total of bands assigned to signal VCs for each path is registered as a fixed "band capacity", that value is entered from the system console 131. If the "band capacity" is specified based on the number of VCs, then the product of "basic number of signal VCs" and "basic VC band" or the product of "number of signal VCs currently established" and "basic VC band" is registered.

"VPI/VCI" are identifiers that identify the virtual channels used for transfer of voice call signaling data in the path. In this embodiment, there is a function that increases the number of signal VCs as the number of voice calls increases, and decreases the number of signal VCs as the number of voice calls decreases. When the number of signal VCs is increased by this function, the VPI/VCIs that identify the newly established signal VCs are registered in "VPI/VCI" of these band supervision data 302; when the number of signal VCs is decreased, the VPI/VCIs that identify the signal VCs that are released are deleted from "VPI/VCI" in these band supervision data 302.

"Average band" is the average value of bands assigned for the purpose of signaling of voice calls in each path. This average band determines the interval at which cells that store the voice call signaling data are sent to the ATM network 1 from the ATM multiplexing node 10.

Data to which "S" is attached are fixed data that are entered from the system console 131. Once these data are registered, they do not change until an instruction for change comes from the system console 131. Data to which "D" is attached are variable data that are updated in response to conditions while the ATM multiplexing node is in operation. These data are updated at either regular or irregular intervals. Data to which "S/D" is attached are data which are registered either upon being entered from the system console 131 or after being updated in response to conditions. The ATM multiplexing node has a function that permits either of these 2 registration methods to be selected by the user.

FIG. 9A is a diagram to explain the VPI/VCI supervision data 303. The VPI/VCI supervision data 303 stores the condition of each signal VC set in each path with the path number as a key. In the ATM multiplexing node, the VPI/VCI to be used as the signal VC is predetermined. The number of VPI/VCIs used as signal VCs is registered as the "basic number of signal VCs" in the band supervision data 302. Then, when a signal VC is actually established, the system hunts for one unused VPI/VCI from among the predetermined VPI/VCIs, and assigned to that signal VC. Consequently, these "VPI/VCIs" in the VPI/VCI supervision data 303 identify the VPI/VCIs that are used as signal VCs in each path, respectively. In the VPI/VCI supervision data 303, the "next VPI/VCI" through "number of voice calls for which resetting is executed" are registered for each VPI/VCI.

"Next VPI/VCI" indicates the next VPI/VCI to be hunted for when a new signal VC is established as described above. "VC band" is the band that is assigned to the signal VC. "Number of arrived calls in progress" is the number of calls that have arrived at the ATM multiplexing node via the signal VC. "Number of originated calls in progress" is the number of calls that the ATM multiplexing node has placed via the signal VC. "Number of VC voice calls" is the maximum number of voice calls assigned to the signal VC. This value is found based on "estimates" of the "VC band" and the band capacity of each signal VC. For example, when the band of each signal VC for each call is estimated to be ⅓ kbps, and if we take VC band=1 kbps, then we obtain the number of VC voice calls as 3.

"Number of voice calls placed" is the number of voice calls that actually exist. This value is updated every time a voice call is placed or a conversation is completed. "Number of voice calls for which resetting is executed" is the threshold number of voice calls. The ATM multiplexing node of this embodiment has a function which, if the number of calls assigned to a signal VC drops below a predetermined threshold, transfers those calls to another signal VC. This "number of voice calls for which resetting is executed" is the threshold used in judging whether or not to assign calls to another signal VC.

FIG. 9B is a diagram to explain system condition supervision data 304. System condition supervision data 304 stores the present date and time, system operating conditions, etc. "Present date", "present day of the week" and "present time of day" are data shown by the clock and calendar incorporated into the ATM multiplexing node. "System fixed band" is a band assigned for the purpose of signaling of voice calls when the number of calls increases. Note that a separate "system fixed band" can be set for each path. "Learning selection condition" is a flag that indicates whether or not to execute the learning processing that will be explained below. "Sequential VC band capture condition" is a flag that indicates whether or not to start the signal VC band sequential capture unit 102 and the signal VC band sequential release unit 103.

FIG. 10A is a diagram to explain the day of week number of VCs supervision data 305. Day of week number of VCs supervision data 305 stores "number of signal VCs", "number of VC voice calls", "number of voice calls placed" and "average band" for each path, each day of the week and each time band. FIG. 10B is a diagram to explain the date of month number of VCs supervision data 306. Date of month number of VCs supervision data 306 stores "number of signal VCs", "number of VC voice calls", "number of voice calls placed" and "average band" for each path and each date.

Figures 11A, 11B:
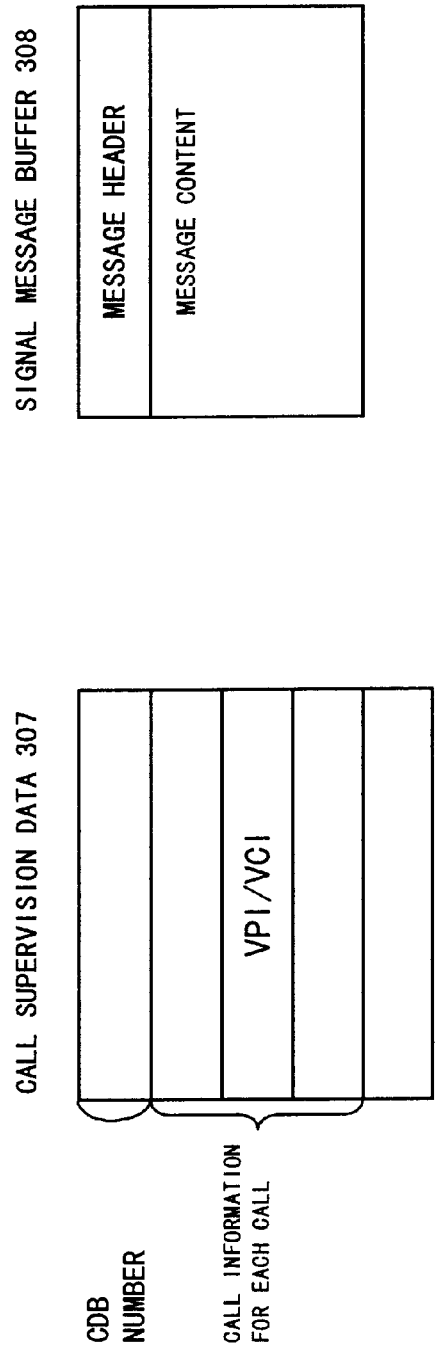
FIG. 11A shows a figure explaining the call supervision data.
FIG. 11B shows a figure explaining the signal message buffer.

FIG. 11A is a diagram to explain the call supervision data 307. Call supervision data 307 stores call information for each call, with the Call Data Block (CDB) number as a key. The call information includes the "VPI/VCI" assigned to that call. FIG. 11B is a diagram to explain the signal message buffer 308. The signal message buffer 308 temporarily stores the various types of messages (SETUP, CONNECT, etc.) received by the ATM multiplexing node.

FIG. 12A is a diagram to explain the waiting supervision data 309. Waiting supervision data 309 include information that defines the order in which calls are processed when a plurality of voice calls are placed simultaneously. "Number of voice calls waiting" is the number of voice calls placed simultaneously. FIG. 12B is a diagram to explain the service category data 310. Service category data 310 stores the transmission rate of each communication service category for the purpose of transferring signaling data. The communication service categories which are supported are CBR (Constant Bit Rate), VBR (Variable Bit Rate), UBR (Unspecified Bit Rate) and ABR (Available Bit Rate).

Next, let us explain the detailed action of the signal band control device of this embodiment referring to the flowcharts.

FIG. 13 is a flowchart of the initial band settings for each signal VC. Here, it is assumed that the VPI/VCI that is used as the signal VC for each path has been predetermined.

In step S1, "VC band" and "number of VC voice calls" are input from the system console 131 for each VPI/VCI. These input data are transferred to the Application Processor 100 via the LAN port 127.

In step S2, the system searches for the VPI/VCI supervision data 303 using the VPI/VCI in the input data as a key, and specifies the area in which the input data are to be stored. In step S3, "VC band" and "number of VC voice calls" that were input in step S1 are set in the area obtained in step S2. Steps S2 and S3 are executed from the VC band setting unit 211.

By repeating steps S1 to S3 described above, "VC band" and "number of VC voice calls" are set for each signal VC on each path contained in the ATM multiplexing node 10.

Figure 14:
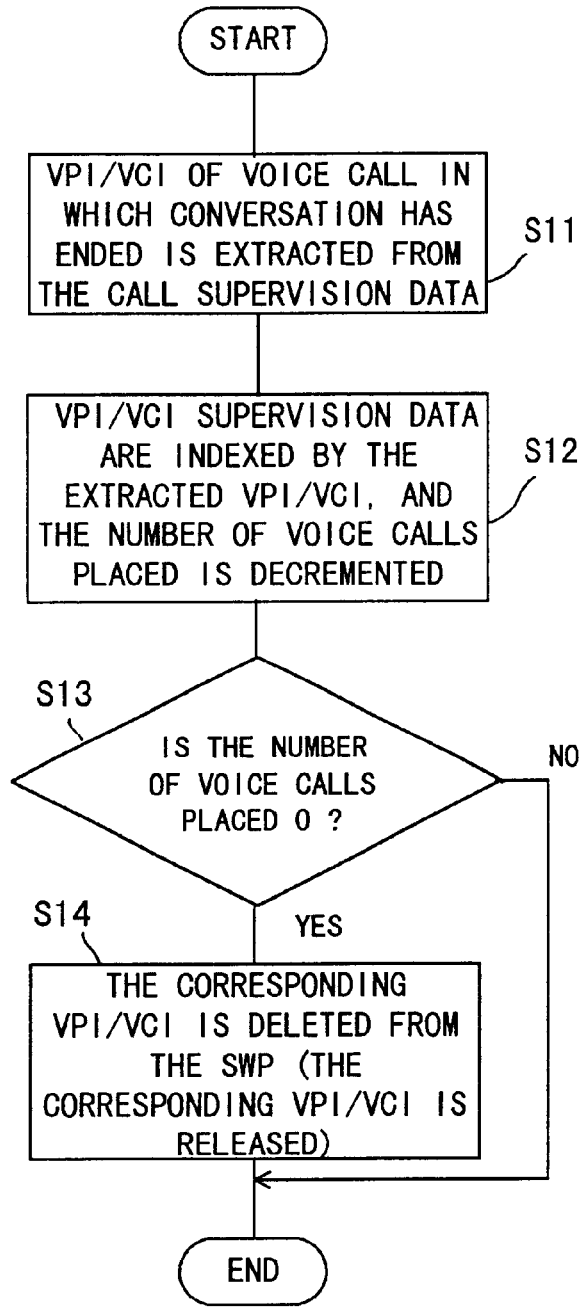
FIG. 14 is a flowchart of the processing to release a signal VC.

FIG. 14 is a flowchart of the processing that releases signal VCs. Here, let us explain the processing after a voice call that has been established through the ATM multiplexing node 10 is completed.

In step S11, the VPI/VCI that was used for the signaling data of the voice call that was completed is extracted from the call supervision data 307. That is to say, when the completion of a conversation is detected in the voice trunk card 121, the call supervision data 307 are accessed using the Call Data Block number that identifies the voice call corresponding to the conversation that was completed, and from there the VPI/VCI of the signal VC is extracted.

In step S12, the system searches for the VPI/VCI supervision data 303 using the VPI/VCI that was extracted in step S11 as a key, and the "number of voice calls placed" is decremented by 1. This brings the "number of voice calls placed" in the VPI/VCI supervision data 303 into agreement with the actual number of calls that exist.

In step S13, the system investigates whether or not the "number of voice calls placed" that was decremented in step S12 has become 0. If this "number of voice calls placed" is 0, it means that no calls are assigned to the corresponding signal VC, so in step S14, the switch processor control unit 250 deletes the corresponding VPI/VCI from the switch processor 129. The switch processor 129 supervises the virtual channels that are used in the ATM network 1 and their bands. Consequently, when a certain VPI/VCI is deleted from the switch processor 129, the VPI/VCI band that had been assigned to the deleted VPI/VCI becomes available for assignment to other channels. Thus, the signal VC is released. Note that if the "number of voice calls placed" in step S13 is not 0, then step S14 is not executed, and the processing of this flowchart ends.

Thus, when the number of calls that exist in a signal VC becomes 0 by virtue of the completion of the calls that existed in that signal VC, the signal band control device of this embodiment releases that signal VC, and the band that had been assigned to that signal VC becomes available for use by another channel.

Figure 16:
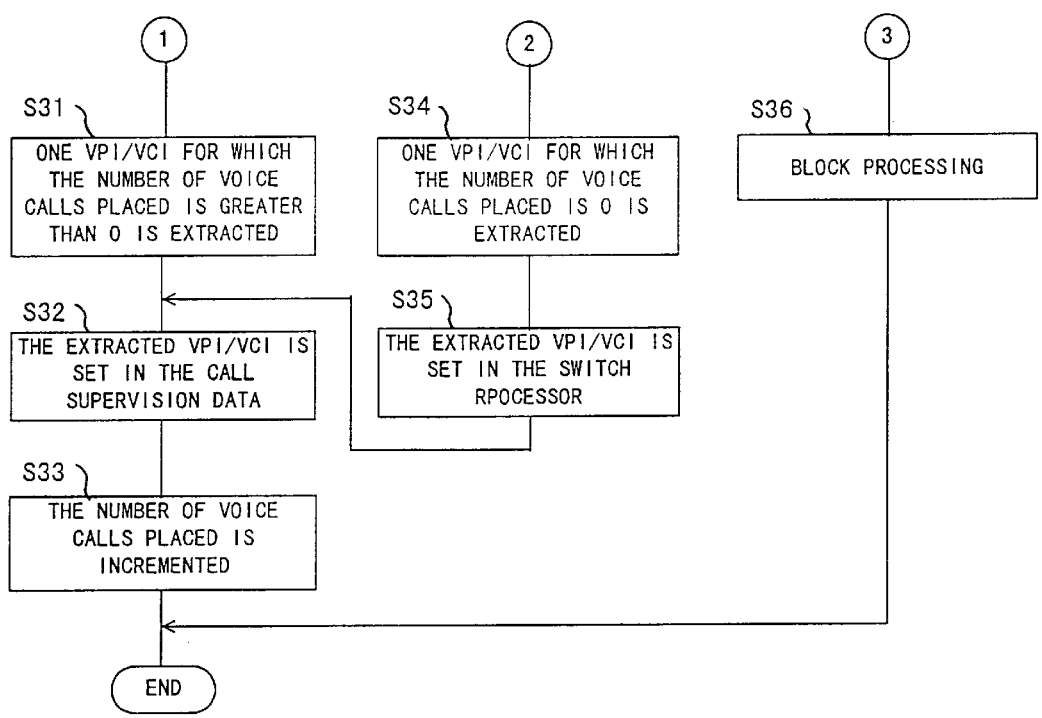
FIG. 16 is a flowchart (2 of 2) of the processing to capture a signal VC.

FIG. 15 and FIG. 16 are flowcharts of the processing by which a signal VC is captured. Here, we explain the processing after the terminal accommodated in the voice node (PBX) that is connected to the ATM multiplexing node 10 has placed a call.

In step S21, the voice call from the PBX is detected. This voice call is transmitted to the Application Processor 100 as a SETUP message via the voice trunk card 121, the line set processor 123 and the ATM switch 124.

In step S22, the arrival ATM address is detected from the arrival destination number that is set in the received SETUP message. In step S23, the system searches through the path supervision data 301 with the arrival ATM address that was detected in step S22 as a key, and extracts the path number that identifies the path on which the SETUP message should be sent. The above-described steps S22 and S23 are executed by the arrival ATM address analysis unit 231.

In step S24, the system searches through the VPI/VCI supervision data 303 with the path number that was extracted in step S23 as a key. In step S25, the system investigates to determine whether or not there exists a VPI/VCI such that "number of VC voice calls" is greater than "number of voice calls placed" as a result of the search in step S24. Here, "number of VC voice calls" is the upper limit of the number of voice calls that can be assigned to each signal VC; "number of voice calls placed" is the number of calls that is actually presently assigned to a given signal VC. Consequently, in step S25, the system judges whether or not a signal VC on which the number of assigned calls has reached its upper limit, that is to say, a signal VC which is not full, exists.

If a signal VC that is not full exists, then the processing proceeds to step S26; and the system investigates whether or not there exists a VPI/VCI for which the "number of voice calls placed" is greater than 0 among the signal VCs that are not full. That is to say, the system investigates whether or not there exists a signal VC to which 1 or more calls has already been assigned. If a VPI/VCI for which the "number of voice calls placed" is greater than 0 exists, then, in step S31, one VPI/VCI is selected from among those available. In step S32, the VPI/VCI that was extracted in step S31 is registered in the call supervision data 307. In step S33, the "number of voice calls placed" in the VPI/VCI supervision data 303 is incremented by 1. In this way, the "number of voice calls placed" in the VPI/VCI supervision data 303 is brought into agreement with the number of voice calls that actually exist.

If a VPI/VCI for which the "number of voice calls placed" is greater than 0 does not exist, the processing proceeds to step S34. In step S34, one VPI/VCI for which the "number of voice calls placed" is 0 is extracted. That is to say, the system hunts for one unused VPI/VCI. In step S35, this newly hunted VPI/VCI is set in the switch processor 129. By this setting, the signaling data for the call that was detected in step S21 are thenceforth transferred via the VPI/VCI that was hunted in step S34. After that, steps S32' and S33 are executed.

If the judgment in step S25 gives a result of "No", then it is considered that all of the signal VCs are full, and the block processing in step S36 is executed. Block processing is processing in which, for example, the call that was detected in step S21 is rejected.

Thus, when a call is detected, the signal band control device of this embodiment first searches for a signal VC among the presently established signal VCs to which that call can be assigned, and, if one is found, assigns that call to that signal VC. If, among the signal VCs that are presently established, a signal VC to which that call can be assigned does not exist, then a signal VC is newly established and the detected call is assigned to that signal VC. That is to say, the calls can be processed using a minimum of band capacity.

FIG. 17 is a flowchart of the processing in which the band capacity to be used as the signal VC is set for each path. In this embodiment, 3 types of specification are provided: "number of VCs specification", "number of calls specification" and "band specification". In "number of VCs specification", an upper limit of the number of signal VCs that can be established is set for each path. In "number of calls specification", an upper limit for the number of voice calls that can be received is set for each path. In "band specification", the band capacity that can be used as the signal VC is set directly for each path.

In step S41, the type of setting and the setting parameters are entered from the system console 131. In "number of VCs setting", the setting parameters are the number of signal VCs and the band of each signal VC; in "number of voice calls setting, the parameters are the number of voice calls and the band of each VC; in "band setting", the parameters are the bands. The input data are transferred to the Application Processor 100 via the LAN port 127.

In step S42, the system judges the type of specification. If the type of specification is "number of VCs specification", then, in step S43, the input parameters are set as the "basic number of VCs" and the "basic VC bands" in the band supervision data 302. If the type is "number of calls", then, in step S44, the input parameters are set as "basic number of calls" and "basic VC bands". If the type of specification is "band specification", then the input parameters are set as "band capacities". The steps S42 to S45 are executed by the band capacity setting unit 214.

Thus, in the signal band control device of this embodiment, a plurality of types of parameters are provided for control of the signal bands, increasing the degree of freedom of user selection. For this reason, the user can design the system flexibly.

Figure 18:
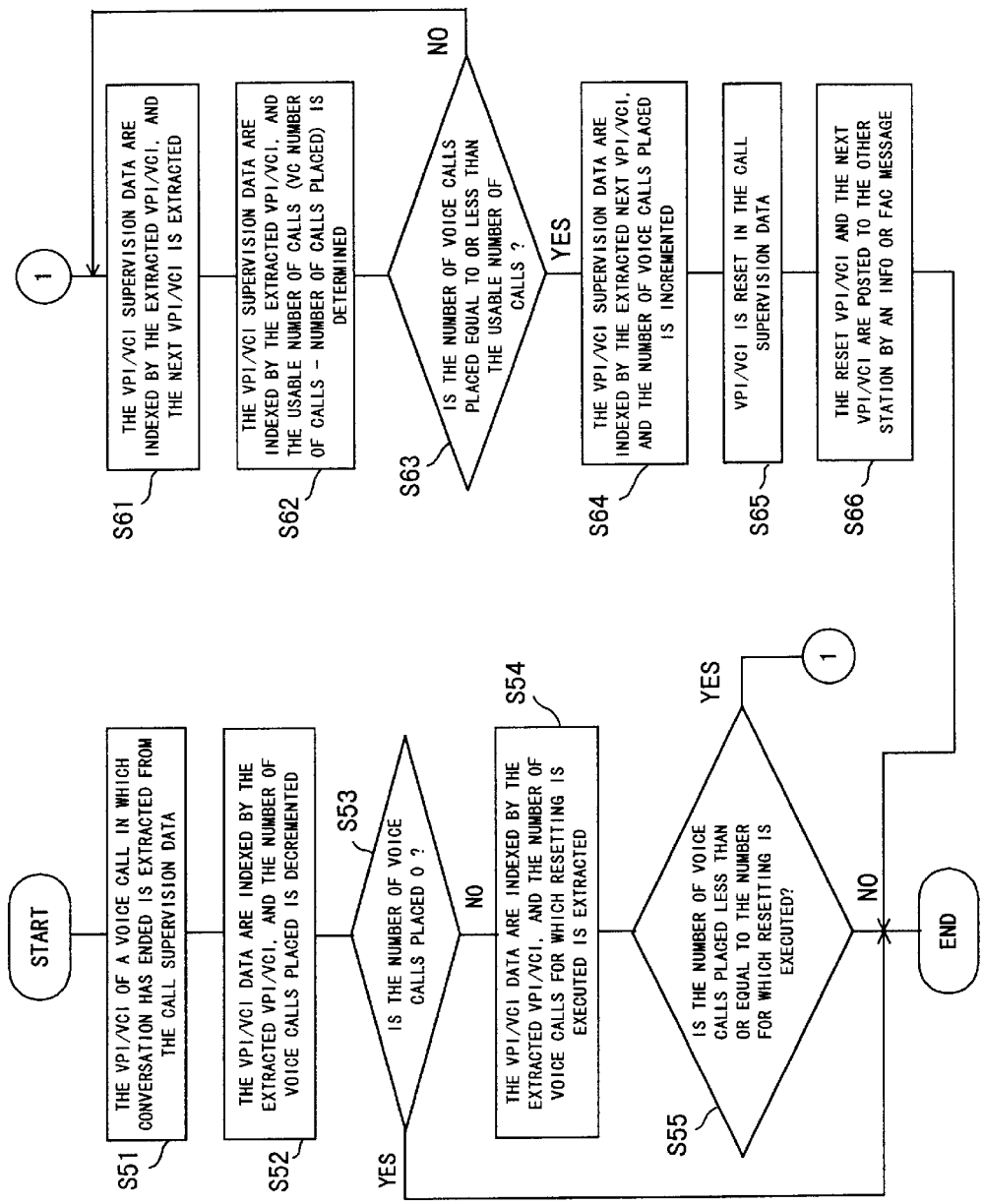
FIG. 18 is a flowchart of the processing to reset a signal VC.

FIG. 18 is a flowchart of the signal VC resetting processing. If the number of calls assigned to a certain signal VC is small, this function re-assigns those calls to another signal VC and thus releases that signal VC. We will henceforth describe this function as the processing after the voice call that has been established when a call was placed from the terminal contained in the ATM multiplexing node 10 has been completed.

In step S51, the VPI/VCI that was used for signaling data for a voice call in which conversation has been completed is extracted from the call supervision data 307. In the explanation of FIG. 18, we will henceforth refer to the signal VC to which this VPI/VCI was assigned as the "old VC". In step S52, the VPI/VCI supervision data 303 are searched with the VPI/VCI that was extracted in step S51 as a key, and the "number of voice calls placed" is decremented by 1. In step S53, the system investigates whether or not the "number of voice calls placed" that was decremented in step S52 is 0. This processing is the same as steps S11 to S13 in FIG. 14.

In step S53, if the "number of voice calls placed" is 0, it means that there are no more calls assigned to the old VC, so that old VC is released. On the other hand, if the "number of voice calls placed" is not 0, then that "number of voice calls placed" is held and the processing proceeds to step S54. In step S54, the VPI/VCI supervision data 303 are searched with the VPI/VCI that was extracted in step S51 as a key, and the "number of voice calls for which resetting is executed" is extracted. In step S55, the "number of voice calls placed" that was held in step S53 and the "number of voice calls for which resetting is executed" that was extracted in step S54 are compared.

If the "number of voice calls placed" is larger than the "number of voice calls for which resetting is executed", then it is judged that a sufficiently large number of calls are assigned to the old VC, and the processing in this flowchart ends without the resetting of the signal VC being executed. On the other hand, if the "number of voice calls placed" is equal to or less than the "number of voice calls for which resetting is executed", then it is judged that the number of calls assigned to the old VC is sufficiently small, and the processing starting in step S61 is executed.

Steps S61 to S63 are the processing in which the system searches for another signal VC to which the remaining calls that are assigned to the old VC can be reassigned. Henceforth, in the explanation of FIG. 18, the signal VC to which these calls are reassigned will be referred to as the "new VC".

In step S61, the VPI/VCI supervision data 303 are searched with the VPI/VCI that was extracted in step S51 as a key, and the "next VPI/VCI" is extracted. In step S62, the VPI/VCI supervision data 303 are searched with this "next VPI/VCI" as a key, the "number of VC voice calls" and the "number of voice calls placed" are extracted, and the "number of voice calls placed" is subtracted from the "number of VC voice calls" to obtain the "usable number of calls". This "usable number of calls" is the number of additional calls that can be assigned to the new VC, and corresponds to the open band in the new VC.

In step S63, the system investigates whether or not the "number of voice calls placed" obtained in step S52 is equal to or less than the "usable number of calls" obtained in step S62. If the "number of voice calls placed" is equal to or less than the "usable number of calls", then it is judged that the remaining calls can be reassigned to the new VC, and the processing starting with step S64 is executed. If the "number of calls placed" is larger than the "usable number of calls", then the processing returns to step S61 and the next candidate is extracted.

In step S64, the VPI/VCI supervision data 303 are searched with the "next VPI/VCI" that was extracted in step S62 as a key, and the "number of voice calls placed" that was obtained in step S52 is added to that "number of voice calls placed". In step S65, the "VPI/VCI" of the calls that were reassigned from the old VC to the new VC is reset in the call supervision data 307. In step S66, the VPI/VCI of the old VC and the VPI/VCI of the new VC are posted to the node that is connected visa the path under consideration. This posting is done using, for example, an INFO message or a FAC message. If an INFO message is used, the said two VPI/VCIs are stored in its user—user information section.

Subsequently, when a response message (a message that confirms that the VPI/VCI has been changed) is received from the posting destination node, the VPI/VCI supervision data 303 are searched with the VPI/VCI of the old VC as a key, and the "number of voice calls placed" is cleared; in addition, the VPI/VCI of the old VC is deleted from the switch processor 129. In this way, the band capacity that had been assigned to the old VC can be reassigned to another channel.

Figure 19:
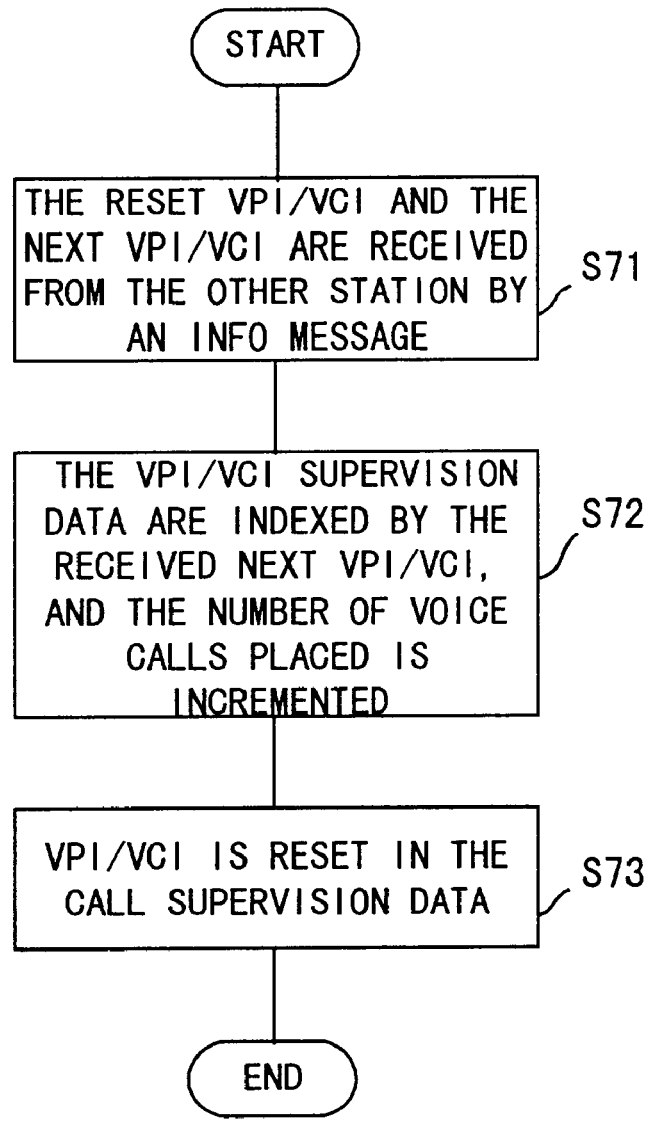
FIG. 19 is a flowchart of the processing in a node that receives a message sent by the processing in FIG. 18.

FIG. 19 is a flowchart of the processing in the node that received the message sent in the processing in FIG. 18. Note that the node that received that message has the same configuration as the ATM multiplexing node 10.

In step S71, the message that was sent by the processing in FIG. 18 is received. The VPI/VCI of the old VC and the VPI/VCI of the new VC are set in this message. Steps S72 and S73 are basically the same as steps S64 and S65. Consequently, by this processing, the VPI/VCI settings, etc., in the set of ATM multiplexing nodes connected via a single path are brought into mutual agreement.

We now present an example of the above processing. Suppose that at a given time, two calls are assigned to the signal VC (a) and the signal VC (b), respectively. The "number of VC calls" for each of these two signal VCs is respectively 3; in addition, suppose that the "numbers of voice calls for which resetting is executed" are respectively 1. When one of the two calls that is assigned to the signal VC (b) ends, the remaining number of calls in the signal VC. (b) becomes one. At this time, the "usable band" of the signal VC (a) is one. Consequently, the remaining call in the signal VC (b) is reassigned to the signal VC (a), and the signal VC (b) is released.

Thus, if the number of calls assigned to a certain signal VC becomes small, the signal band control device of this embodiment reassigns those calls to another signal VC, and thus releases that signal VC. For this reason, band capacity is used effectively.

Figure 20:
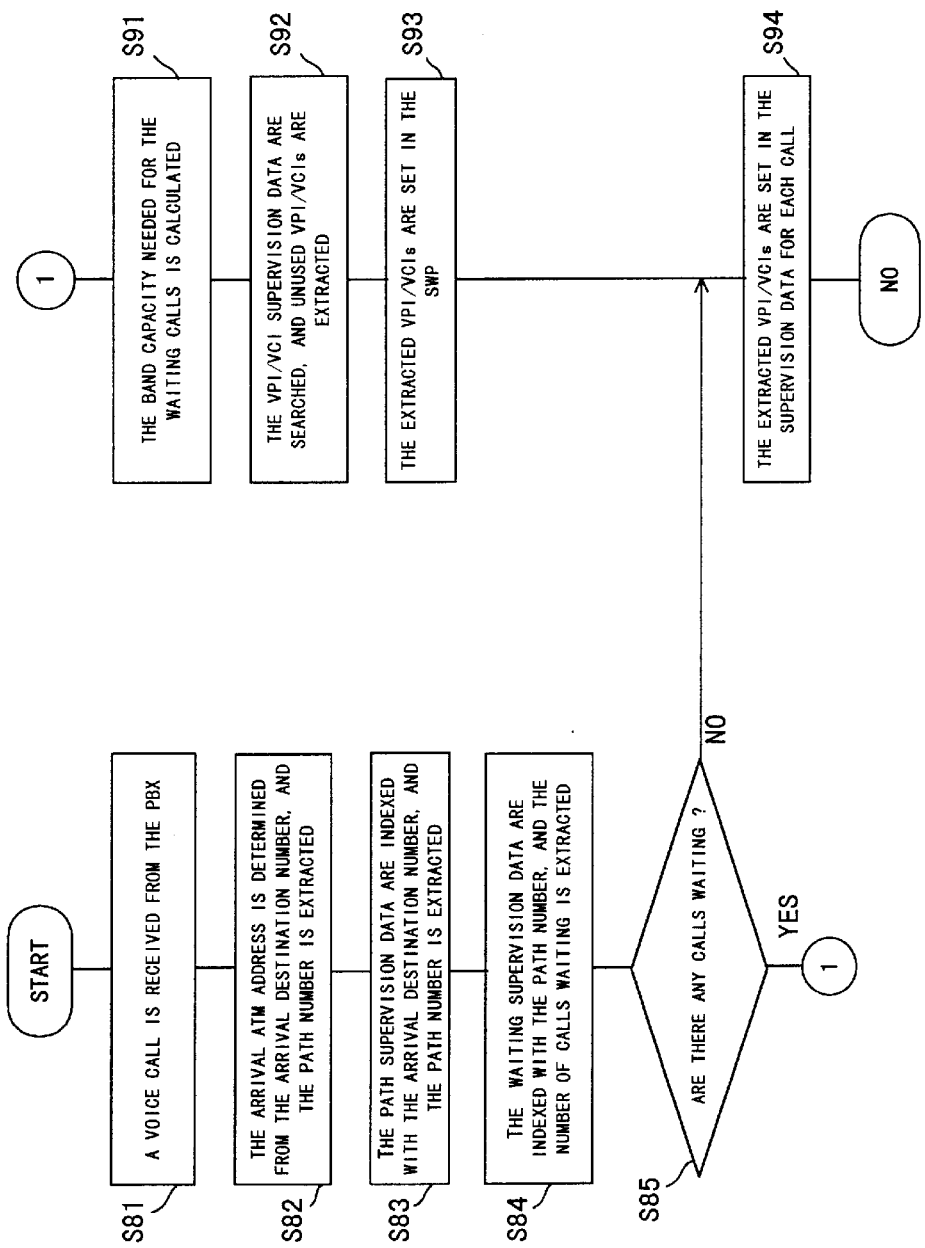
FIG. 20 is a flowchart of the processing in case a plurality of calls are made simultaneously.

FIG. 20 is a flowchart of the processing in a case in which a plurality of calls are placed simultaneously. Here, we explain the processing after the terminal accommodated in the voice node (PBX) connected to the ATM multiplexing node 10 has originated a call.

Steps S81 to S83 are the same as steps S21 to S23 shown in FIG. 15. The voice call from the PBX is detected; then the arrival ATM address that corresponds to that call is detected; then the path number that identifies the path on which the SETUP message should be sent is extracted.

In step S84, the waiting supervision data 309 are searched with the path number that was extracted in step S83 as a key, and the "number of voice calls waiting" is extracted. In a case in which a plurality of calls are placed simultaneously, this "number of voice calls waiting" indicates the number of calls that are in a state of temporarily waiting to be processed. In step S85, the system investigates whether or not the "number of voice calls waiting that was extracted in step S84 is one or greater.

If the "number of voice calls waiting" is one or more, then, in step 91, the band corresponding to that number of calls is calculated. In this embodiment, the number of calls that should be assigned to a unit band is registered as the "basic number of VC calls" in the band supervision data 302. Consequently, by dividing the "number of voice calls waiting" by the "basic number of VC calls", the amount of band capacity needed to assign the calls that are waiting can be determined.

In step S92, the system searches for unused VPI/VCIs in the path being considered. That is to say, the VC supervision data 303 are searched, and VPI/VCIs for which the "number of voice calls placed" is 0 are extracted. At this time, it is necessary to provide the amount of band capacity computed in step S91 using a newly established signal VC. Consequently, in this case, the band computed in step S91 is set as the "VC band" of that extracted VPI/VCI. Or, alternatively, for example, in the condition in which the number of calls assigned to each signal VC is fixed at "3", if the number of waiting calls is 4, it is necessary to newly capture 2 signal VCs, so in this case 2 unused VPI/VCIs are extracted.

In step S93, the VPI/VCI that was extracted in step S92 is set in the Switch Processor 129. In step S94, the VPI/VCI that was extracted in step S92 is set in the call supervision data for each call that is waiting.

If there is no call in the waiting condition in step S85, then steps S91 to S93 are skipped, and step S94 is executed for the call that was detected in step S81.

Thus, in this embodiment, in a case in which a plurality of calls are originated simultaneously, the band corresponding to that number of calls is captured all at once, so the band is used effectively, and, in addition, shortening of the connection time can be expected.

Next, let us explain the average band for the purpose of transferring the signaling data. In the ATM multiplexing node of this embodiment, an average band for the purpose of transferring signaling data is set for each path. The cells in which the signaling data are stored are sent at intervals determined based on the average bands sent for each respective path.

Figure 21:
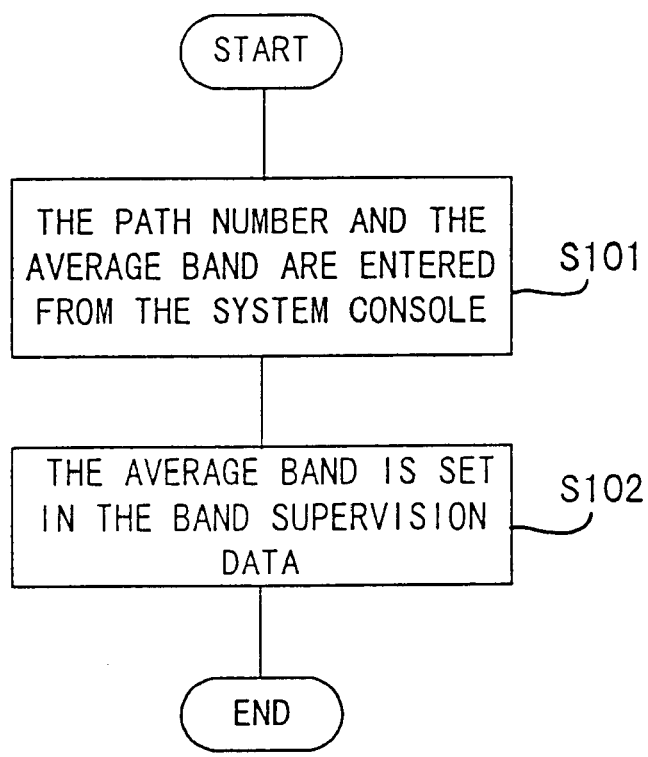
FIG. 21 is a flowchart of the processing to set an average band.

FIG. 21 is a flowchart of the processing that sets the average band. In step S101, the path number and the average band to be set are entered from the system console 131. In step S102, the average band that was input is written into the band supervision data 302 with the path number as a key.

Thus, in this embodiment, the desired average band can be set from the system console. Consequently, if, for example, it is expected that the number of calls will increase or decrease, the average band can be changed before that increase or decrease occurs. In such a case, the signal band is adjusted to accompany this change in the average band. In this embodiment, the input from the system console is checked at specified intervals, and the signal band is adjusted by capturing signal VCs in accordance with those input data.

Figure 22:
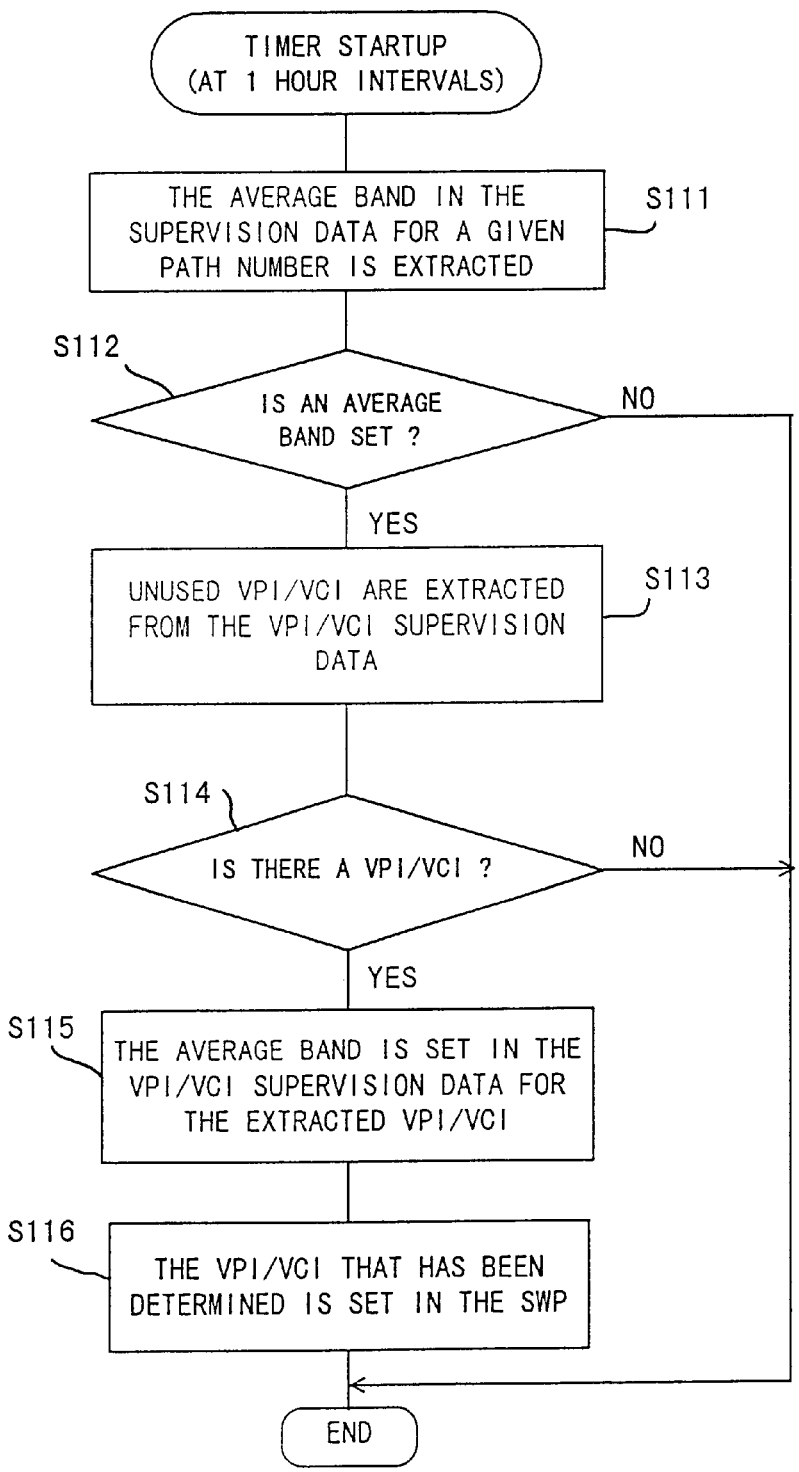
FIG. 22 is a flowchart of the processing to change the system in accordance with the average band that has been set.

FIG. 22 is a flowchart of the processing that changes the signal band in accordance with the average band that has been set. Note that the processing in this flowchart is started once per hour by the timer, and is executed for each respective path.

In step S111, the band supervision data 302 are accessed with the path number as a key, and the "average band" is extracted. In step S112, the system investigates whether or not the "average band" has been set; if it has been set, then the processing proceeds to step S113. In step S113, the VPI/VCI supervision data 303 are accessed with the path number that was used in step S111 as a key, and the unused VPI/VCIs are extracted. That is to say, the VPI/VCIs for which the "number of voice calls placed" is 0 are extracted. In step S114, the system investigates whether or not an unused VPI/VCI was found; if at least one was found, then the processing proceeds to step S115.

In step S115, one unused VPI/VCI is extracted. Then, in the VPI/VCI supervision table 303, the "average band" that was extracted in step S111 is set as the "VC band" of that extracted VPI/VCI. In step S116, the VPI/VCI is set in the Switch Processor 129. In this way, a signal VC that has the average band that was entered from the system console is established.

In general, the volume of communications on a public network varies with the day of the week, the time of day and the date. For example, the volume of communications is greater on a weekday than on Saturday or Sunday, while it is less late at night and early in the morning than during the daytime. Sometimes the volume of communications increases toward the end of the month, while it tends to decrease on holidays. This embodiment provides functions that permit the signal band capacity to be allocated in accordance with such predictable changes in the volume of communications.

Figure 23:
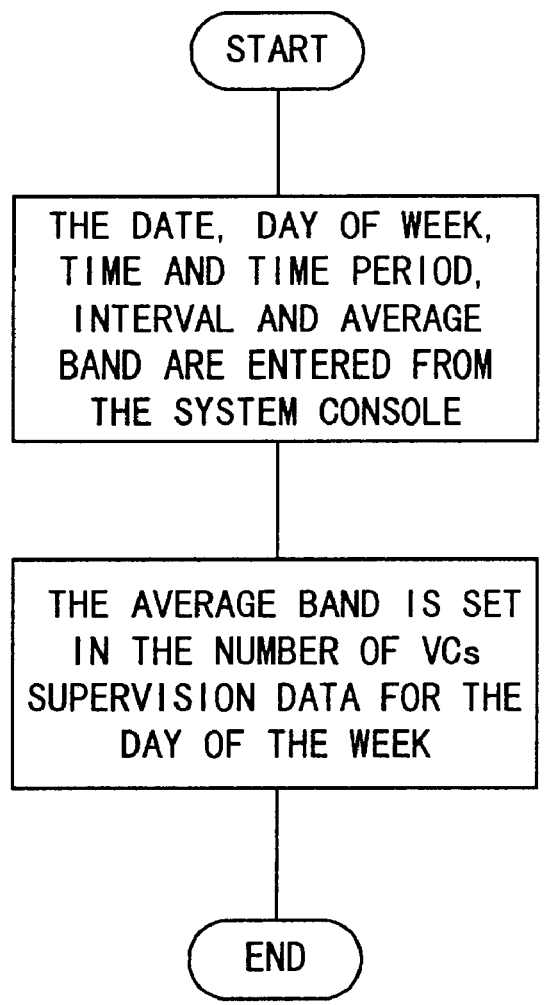
FIG. 23 is a flowchart of the processing to set the average band for each day of the week and time band.

FIG. 23 is a flowchart of the processing that sets the average band for each day of the week and time of day interval. The data input method in this case is the same as the method shown in FIG. 21. The average band for each day of the week and time of day interval is set in the number of VCs supervision data 305 corresponding to that day of the week.

Figure 24:
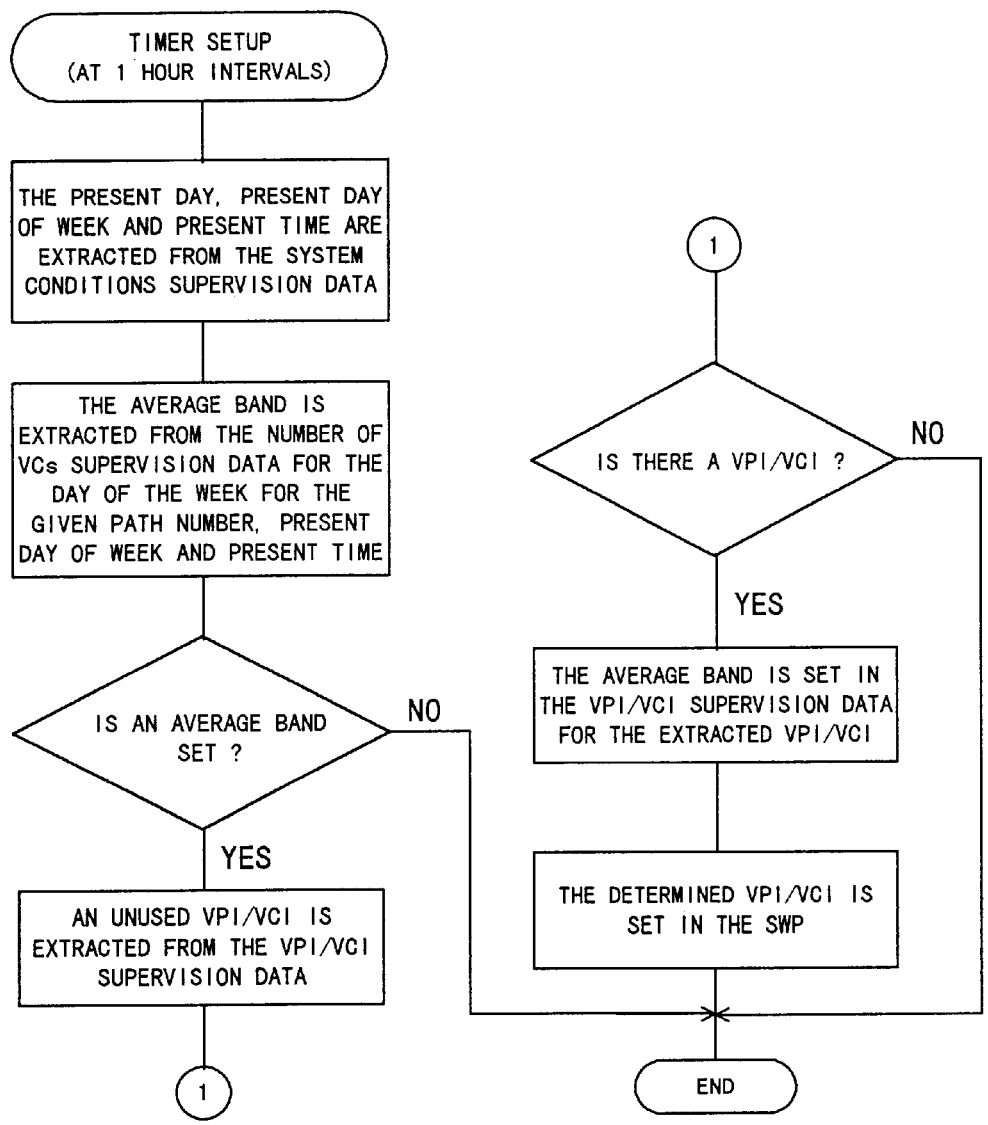
FIG. 24 is a flowchart of the processing to change the signal band in accordance with the average band that has been set for each day of the week and time band.

FIG. 24 is a flowchart of the processing that changes the signal band in accordance with the average band that has been set for each day of the week and time of day interval. The action in this case is basically the same as the action shown in FIG. 22. However, in the processing that sets the band corresponding to a given day of the week and time of day interval, when the processing in the flowchart shown in FIG. 24 is started by the timer, first the present day of the week and time of day are detected referring to the calendar and the clock in the ATM multiplexing node. Then the number of VCs supervision data 305 corresponding to that day of the week are searched using those as keys, and the "average band" set for the present day of the week and time of day is extracted.

The subsequent action is the same as the action shown in FIG. 22, and a signal VC having the extracted average band is established.

Figure 25:
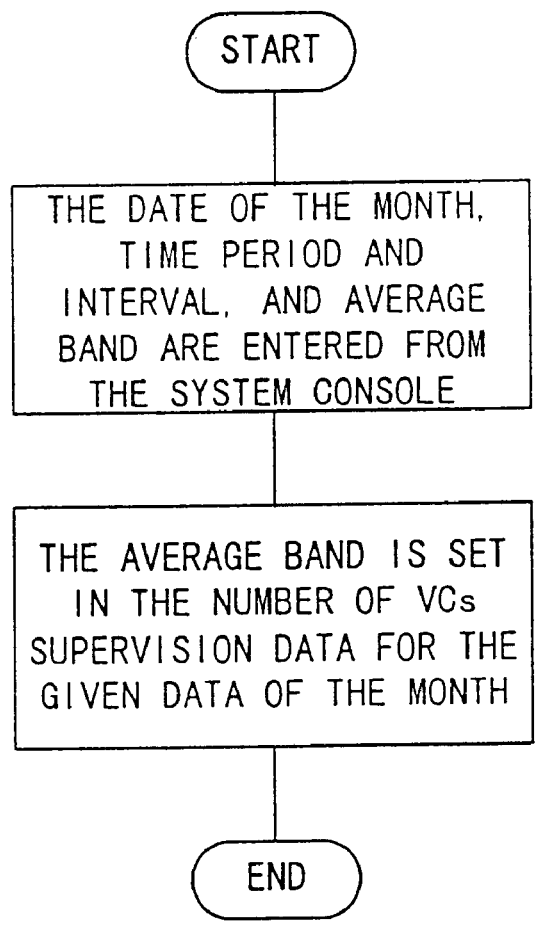
FIG. 25 is a flowchart of the processing to set the average band for each date.

FIG. 25 is a flowchart of the processing that sets the average band for each date. The data input method in this case is the same as the method shown in FIG. 21. The average band for each date is set in the number of VCs supervision data 306 corresponding to that date.

Figure 26:
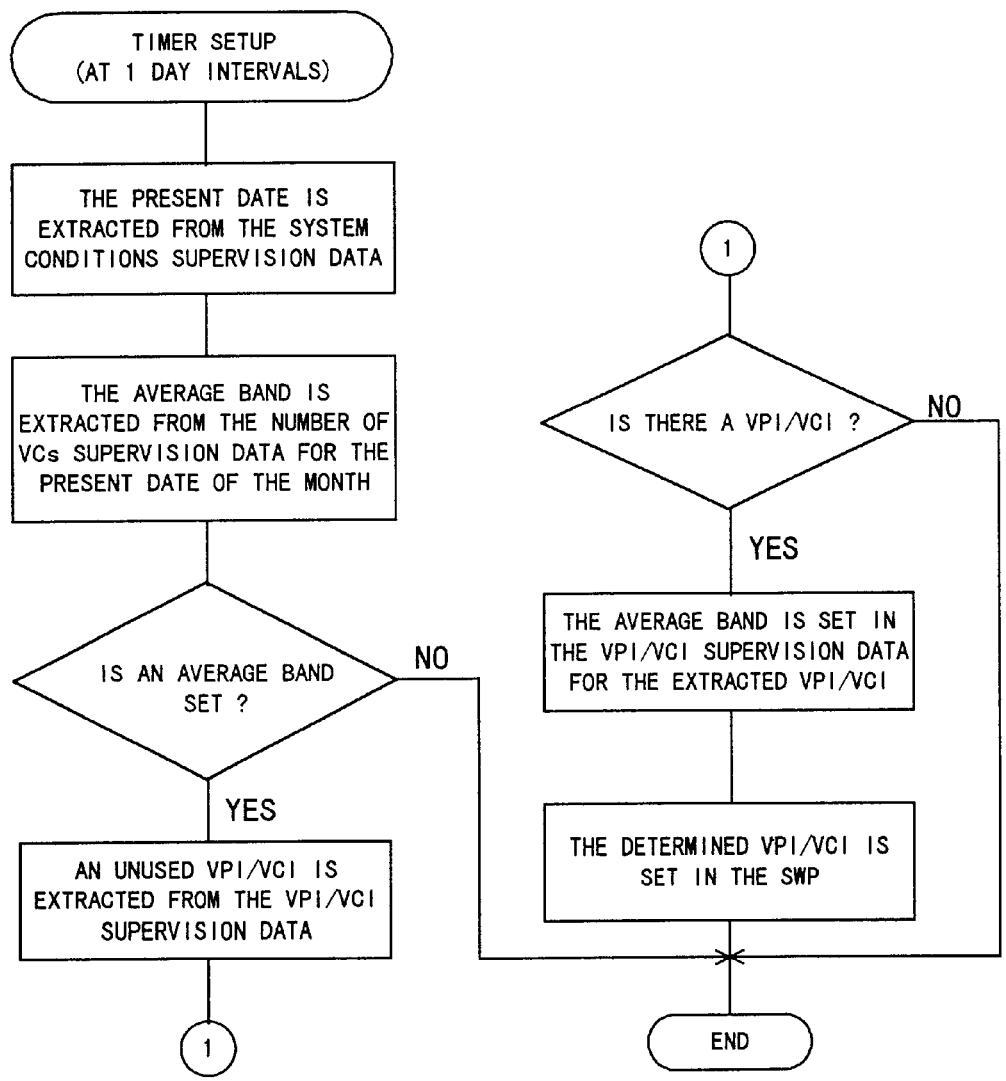
FIG. 26 is a flowchart of the processing to change the signal band in accordance with the average band that has been set for each date.

FIG. 26 is a flowchart of the processing that changes the signal band in accordance with the average band that has been set for each date. The action in this case is basically the same as the action shown in FIG. 22. However, in band setting processing that corresponds to a certain date, when the processing in the flowchart shown in FIG. 26 is started by the timer, first the present date is detected referring to the calendar in the ATM multiplexing node. Then the number of VCs supervision data 306 corresponding to that date are searched with the date as a key, and the "average band" that is set for the present date is extracted. The subsequent action is the same as the action shown in FIG. 22, and a signal VC having the extracted average band is established. Note that in band setting processing corresponding to a certain date, it is sufficient for the timer to start the processing once per day (for example at 00:00 hours).

Thus, in this embodiment, an arbitrary average band, or average bands for each day of the week and time interval or for each date are set, and signal bands corresponding to that average band are captured at one time, so the band capacity is used effectively, and in addition shortening of the connection time can be expected.

In FIGS. 21 to 26 described above, (1) arbitrary setting for each path, (2) setting for each day of the week and time interval and (3) setting for each date have been described. The device of this embodiment has a function that permits the user to select which of these 3 setting methods to use. In addition, the device of this embodiment has a function that measures and outputs the actual number of calls, etc., in actual operating conditions to provide estimates of the parameters that should be entered when making each of the settings.

Figure 27:
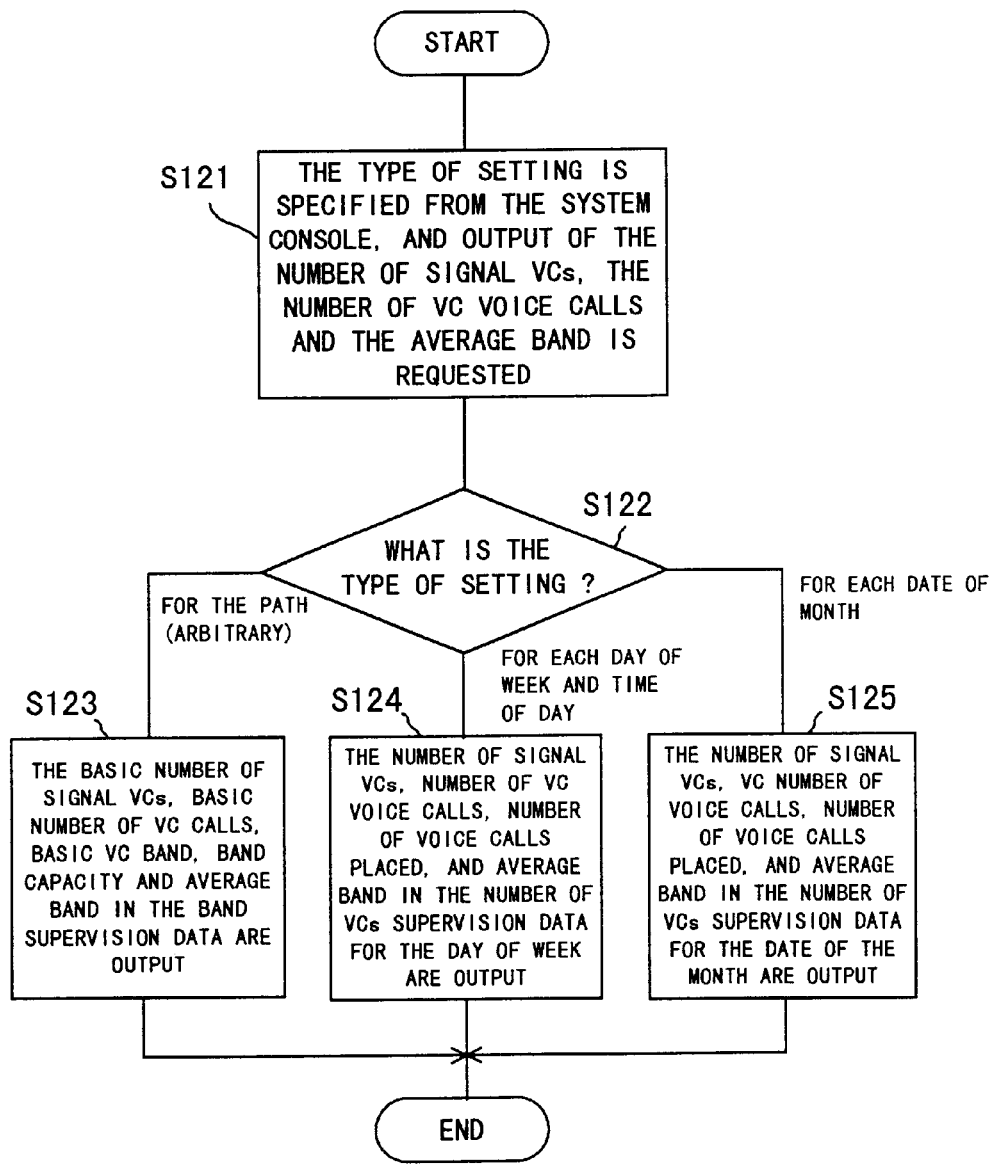
FIG. 27 is a flowchart of the processing to measure the communication condition.

FIG. 27 is a flowchart of the processing that measures the communication conditions. In step S121, the type of setting is specified from the system console 131 and, at the same time, output of the measured values is requested. One of the 3 types of settings listed above must be selected. In step S122, the system recognizes the type of setting that was input.

If the type of setting selected is "for each path (arbitrary)", then, in step S123, the band supervision data 302 and the VPI/VCI supervision data 303 for each band are searched, and the data of each type are fetched and output. In this case, for example it is possible to know the actual signal band that is used from "band capacity" in the band supervision data 302. Or, alternatively, for example if the totals of the "number of voice calls placed" for each VPI/VCI in the VPI/VCI supervision data 303 are computed, those totals are the numbers of calls that are placed in each path. From these values, one knows the actual bands that are being used for signals.

If the type of setting selected is "for each day of the week and time interval", then, in step S124, the band supervision data 305 corresponding to the day of the week for each path are searched, and the data of each type are fetched and output. If the type of setting selected is "for each date", then, in step S125, the number of VCs supervision data 306 for each date are searched, and the data of each type are fetched and output.

The signal band control device of this embodiment has the function of monitoring the actual state of communications and setting the system based on the results of that monitoring. This function is called "learning". In addition, in the learning processing, the actual state of communications under certain conditions is monitored; then, when those same conditions occur again, the signal band can be set in accordance with the results of the earlier monitoring. For example, under the condition that it is "Sunday", the communication conditions are monitored on a certain Sunday, and then on subsequent Sundays the signal band is set based on the results of that monitoring. Note that in this embodiment, in learning processing, the communication conditions shown in FIG. 8 through FIG. 12 are logged and stored as history.

Figure 28:
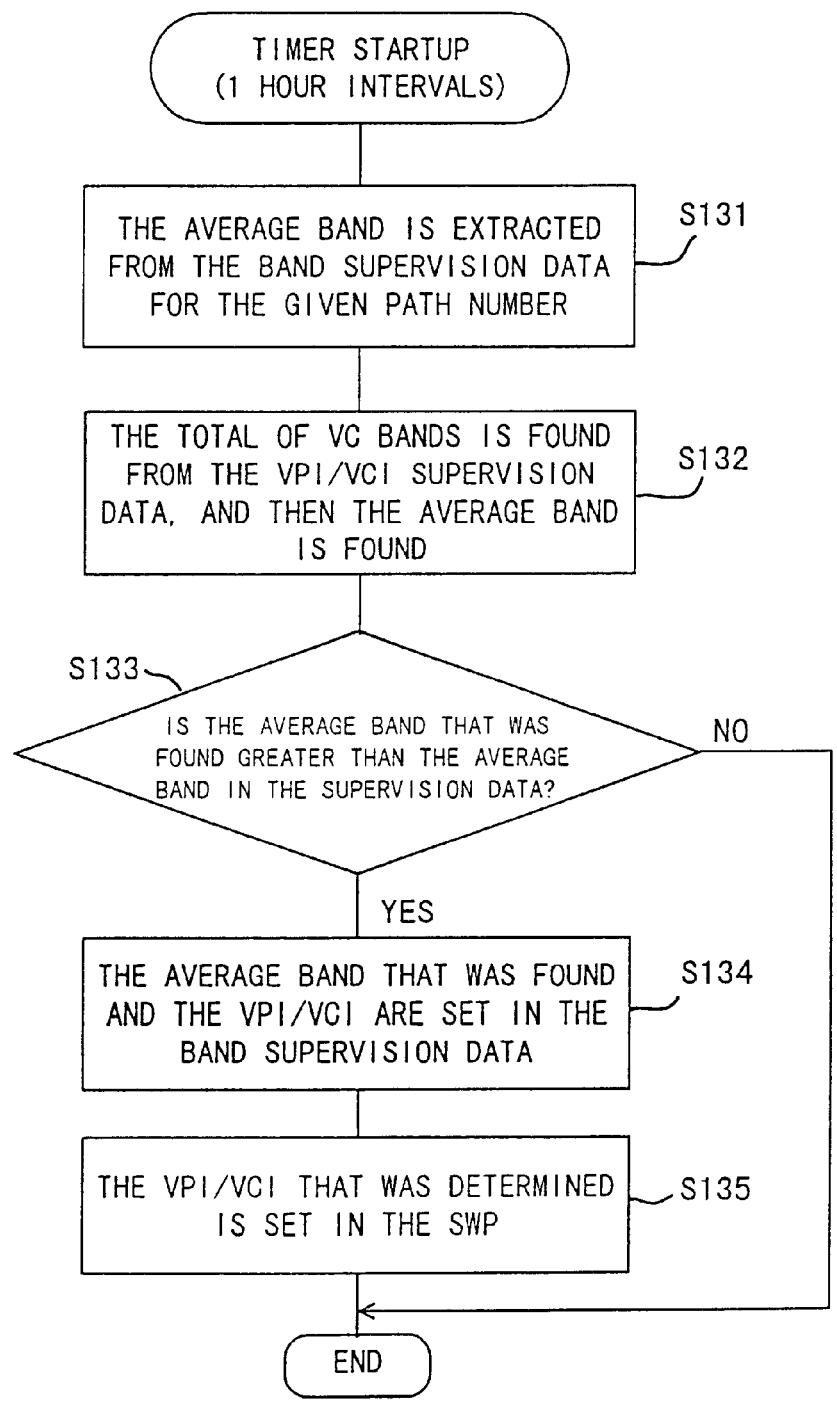
FIG. 28 is a flowchart of the learning processing for each time band.

FIG. 28 is a flowchart of learning processing for a certain time of day interval. This processing is executed for 1 hour time intervals and for each path. In step S131, the band supervision data 302 are searched with the path number as a key, and the "average band" is extracted. In step S132, the VPI/VCI supervision data 303 are searched with the path number as a key, and the actual average value of the signal band is determined. This average band can, for example, be computed from the total of the "number of calls placed" or from the "VC band". It is also possible to use the log for the last hour and find the time average during that interval.

In step S133, the "average band" that was extracted in step S131 and the "average band" that was found in step S132 are compared. If the "average band" that was found in step S132 is larger, then, in step S134, that "average band" that was found in step S132 is set as the "average band" in the band supervision data 302. In addition, the system hunts for an unused VPI/VCI, and registers that VPI/VCI in the band supervision data 302. In step S135, the VPI/VCI that was hunted in step S134 is set in the Switch Processor 129. By means of the above processing, the "average band" that was found in step S132 as the signal band is secured.

Figure 29:
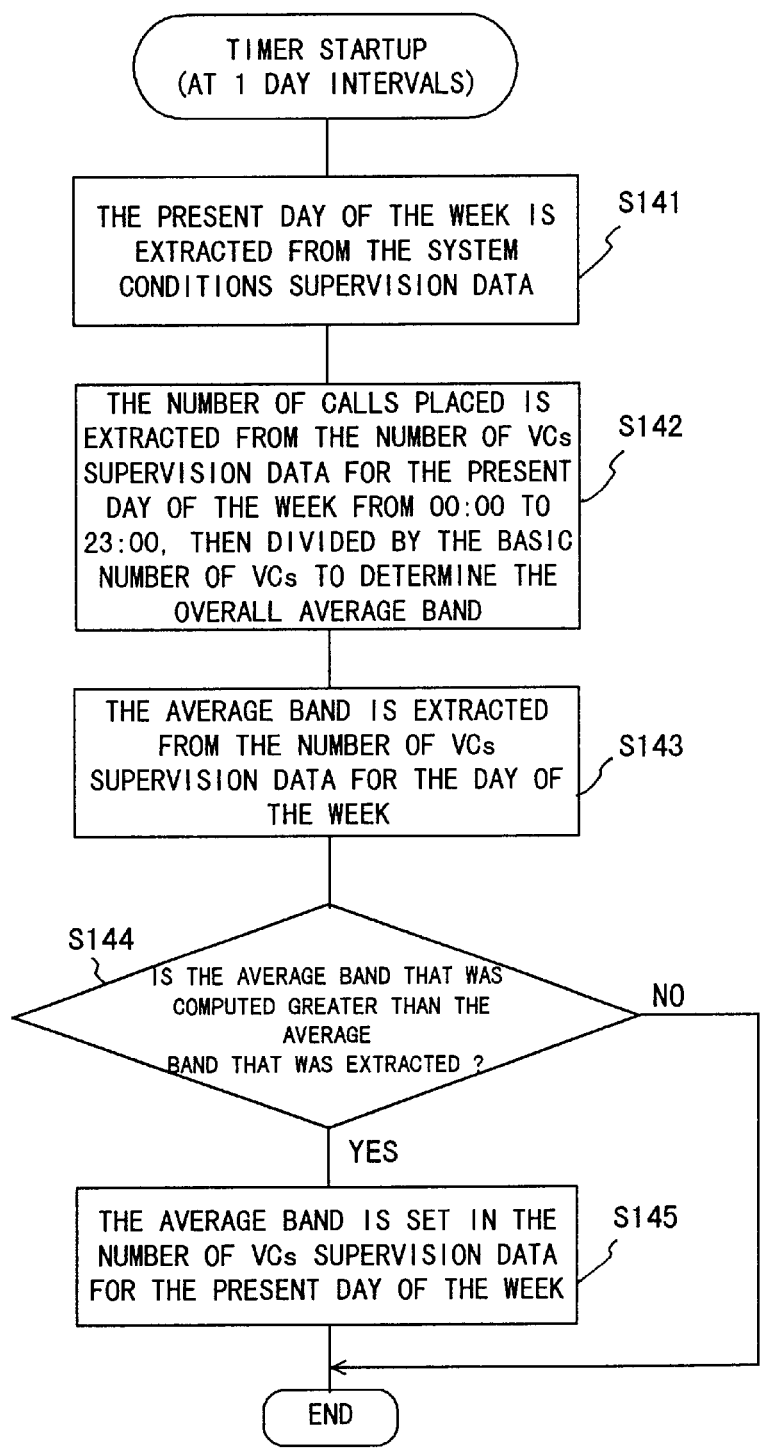
FIG. 29 is a flowchart of the learning processing for each day of the week.

FIG. 29 is a flowchart of the learning processing for a given day of the week. This processing is executed for each day of the week for each path.

In step S141, the "present day of the week" is extracted from the system conditions supervision data 304. That is to say, the present day of the week is recognized. In step 142, the number of VCs supervision data 305 for each day of the week are searched with the "present day of the week" as a key, and the "number of voice calls placed" is extracted for each time of day interval (0:00 hours (twelve-midnight) to 23:00 hours (eleven PM)). Then the "average band" is found for each time of day interval by dividing each "number of voice calls placed" by the "basic number of calls" set in the respective band supervision data 302. At this time, it is sufficient to find the time averages using the log. In step S143, the "average band" is extracted for each time of day interval from the number of VCs supervision data 305 corresponding to the day of the week.

In step S144, the "average band" extracted in step S143 and the "average band" found in step S142 are compared for each time of day interval. If the "average band" found in step S142 is larger, then, in step S145, the "average band" that was found in step S142 is set as the "average band" of the corresponding time of day interval in the number of VCs supervision data 305 for that day of the week.

The said set values are used for the same day of the week the next week and subsequent weeks. That is to say, for example the "average band" obtained as the datum for "09:00 hours on Wednesday" in a certain week is set in the corresponding area in the number of VCs supervision data 305 corresponding to that day of the week. Then, when 09:00 hours comes on Wednesday of the next week, the signal band is assigned in accordance with that "average band".

FIG. 30 is a flowchart of the learning processing for each date. This processing is executed each month for each path.

In step S151, the number of VCs supervision data 306 are searched for each date, and the "number of voice calls placed" is extracted for each date (from the 1st to the 31st). Then the "average band" is found for each date by dividing each "number of voice calls placed" by the "basic number of calls" set in the corresponding band supervision data 302. At this time, the time average can be found using the log. In step S152, the "average band" is extracted for each date from the number of VCs supervision data 306 corresponding to that date.

In step S153, the "average band" that was extracted in step S152 and the "average band" that was found in step S151 are compared for each date. If the "average band" found in step S151 is larger, then, in step S154, that "average band" found in step S151 is set as the "average band" for that date in the corresponding number of VCs supervision data 306 for the same date.

The said set values are used on the same date in the next month and subsequent months. That is to say, for example the "average band" obtained as the datum for the 21st of a certain month is set in the corresponding area of the number of VCs supervision data 306 corresponding to that date. Then, when the 21st of the next month comes, the signal band is assigned in accordance with that "average band".

Thus, the device of this embodiment has a learning function that automatically assigns band capacity to match the actual operating conditions, reducing the amount of work in band operation supervision. In addition, the optimum band is always assigned as the signal band, so that the band capacity is used with maximum effectiveness.

In this embodiment, the user specifies whether or not the learning function is to be executed. The user enters an instruction as to whether or not the learning function is to be executed via the system console 131. This input is registered as the "learning selection condition" in the system condition supervision data 304.

FIG. 31 is a flowchart of the learning selection processing. In step S161, the "learning selection condition" is extracted from the system conditions supervision data 304, and then that condition is judged in step S162. If the "learning selection condition" is "no learning", then, in step S163, the various data that have been entered from the system console 131 are set in the specified areas in the main memory device 300. The setting method is as shown in FIG. 21 through FIG. 26. In this case, the band data have fixed values. On the other hand, if the "learning selection condition" is "learning", then, in step S164, the various data are set by the learning processing shown in FIG. 28 to FIG. 30. In this case, the band data become variable data.

Thus, in this embodiment, whether or not learning processing is executed can be freely selected, so that the user can respond flexibly to the network characteristics.

Next, let us explain the technology that avoids duplicate capture of signal bands. On a path between two ATM multiplexing nodes, signal VCs are established in both directions. In this embodiment, a method of capturing signal bands for originated calls and arriving calls simultaneously is introduced in the ATM multiplexing node.

Figure 33:
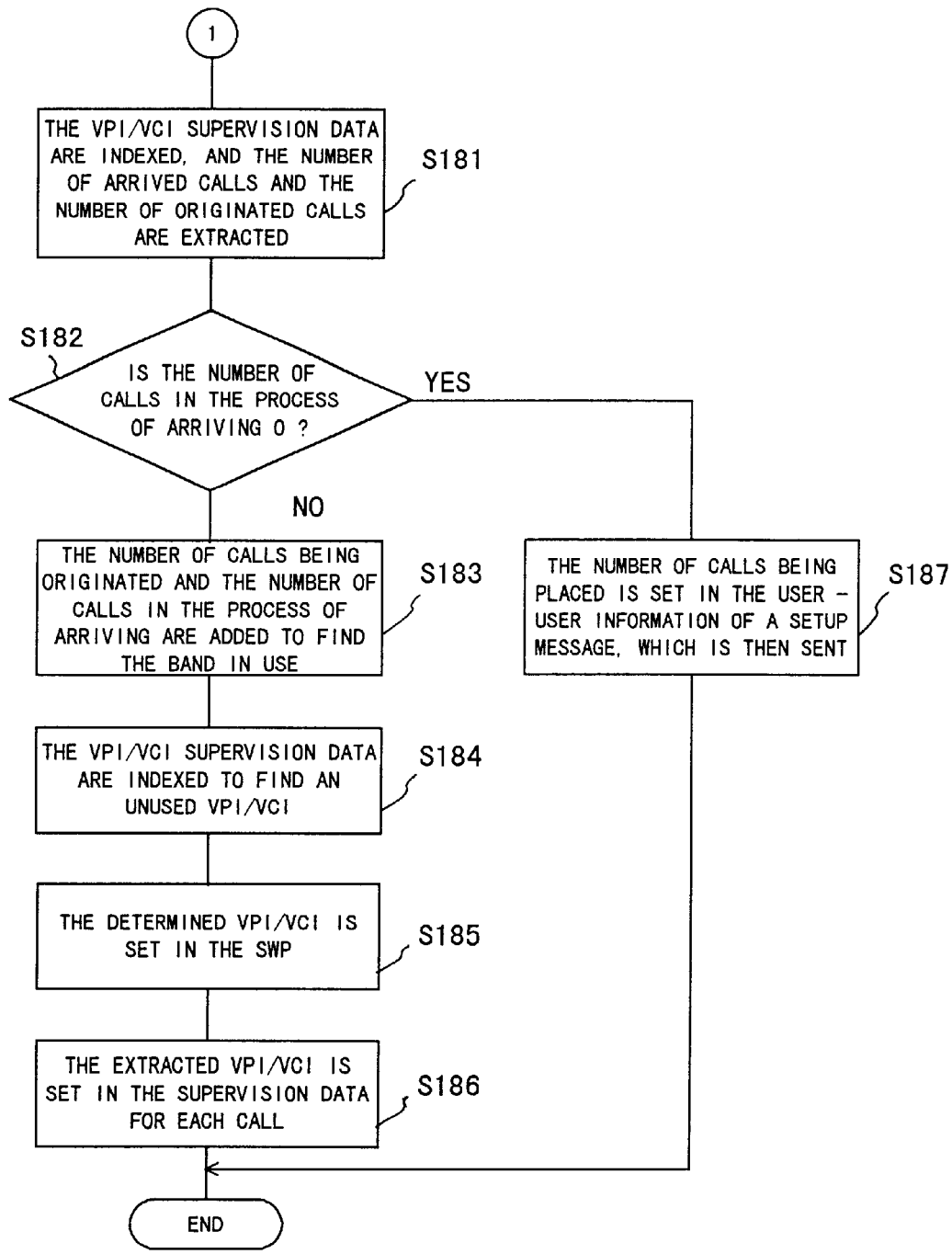
FIG. 33 is a flowchart (2 of 2) of the processing to avoid duplicate capture of a signal band.

FIGS. 32 and 33 are flowcharts of the processing that avoids duplicate capture of signal bands. Here, these flowcharts explain the execution in the ATM multiplexing node that accommodates the terminal that originates the calls (the call originating station).

Steps S171 to S173 are the same as steps S21 to S23 shown in FIG. 15. A voice call from the PBX is detected, then the arrival ATM address corresponding to that voice call is detected, then the path number that identifies the path on which the SETUP message should be sent is extracted.

Steps S174 to S176 are the processing in which the system investigates whether or not a call already exists in the path that leads to the destination of the call that was detected in step S171. In step S174, the VPI/VCI supervision data 303 are searched with the path number that was extracted in step S173 as a key; one VPI/VCI is selected and its "number of voice calls originated" is extracted. In step S175, the system investigates whether or not the "number of voice calls originated" that was extracted in step S174 is 0. If the "number of voice calls originated" is 0, then it is considered that no calls exist in the VPI/VCI that was selected in step S174, and the processing proceeds to step S176. Step S176 is step in which the system investigates whether or not the judgment in the step S175 has been executed for all of the VPI/VCIs in the VPI/VCI supervision data 303. If there remains a VPI/VCI for which the step S175 has not been executed, then the processing returns to step S174 and the next VPI/VCI is selected. On the other hand, if, in step S175, the "number of voice calls originated" is not 0, then it is considered that a call already exists in the VPI/VCI selected in step S174, and the processing proceeds to step S181.

In step S181, the VPI/VCI supervision data 303 are searched with the VPI/VCI that was regarded as a VPI/VCI "in which a call already exists in the same path" as the key, and the "number of calls in the process of arriving" and the "band in which calls are being originated" are extracted. In step S182, the system investigates whether or not the "number of calls in the process of arriving" that was extracted in step S181 is 0. If this "number of calls in the process of arriving" is not 0, then the processing starting with step S183 is executed.

In step S183, the "band in use" is obtained by computing the sum of the "number of calls in the process of arriving" and the "number of calls being originated" that were extracted in step S181. In step S184, an unused VPI/VCI is extracted from the VPI/VCI supervision data 303. In step S185, the unused VPI/VCI that was extracted in step S184 is set in the Switch Processor 129. Then, in step S186, the unused VPI/VCI that was extracted in step S184 is set in the call supervision data 307 as the VPI/VCI corresponding to the call detected in step S171.

On the other hand, if the "number of calls in the process of arriving" is 0 in step S182, then, in step S187, it is considered that the band supervision is not yet coordinated between the call originating station and the call terminating station, and the "number of calls being originated" is posted to the call terminating station. This posting uses SETUP, which is the message that establishes the call, and is transferred as user—user information.

Figure 34:
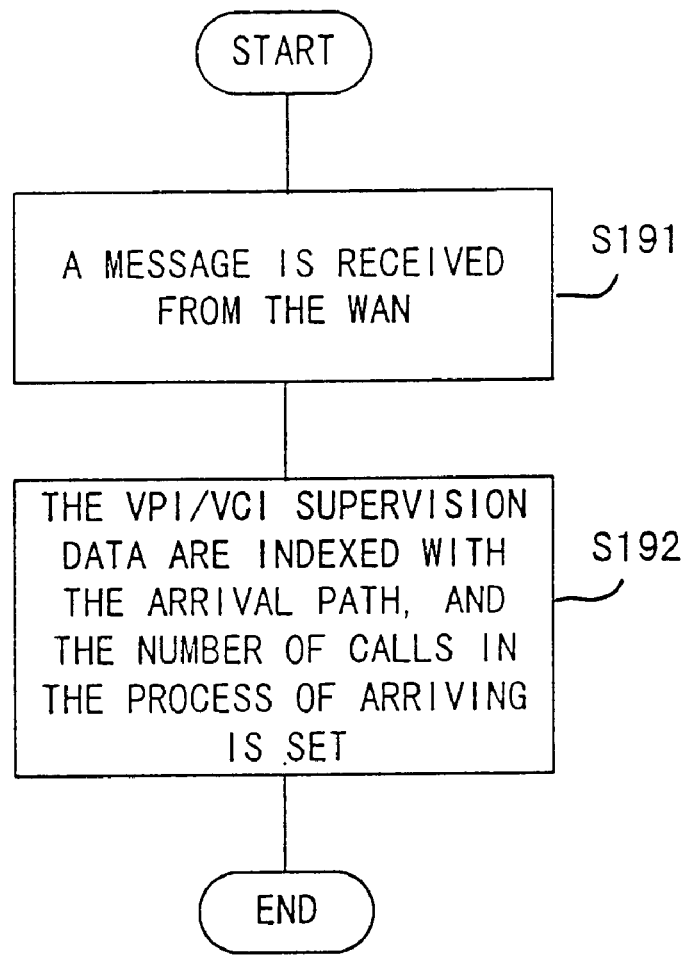
FIG. 34 is a flowchart of the processing in the ATM multiplexing node that receives messages sent by the processing in the flowcharts in FIG. 32 and FIG. 33.

FIG. 34 is a flowchart of the processing in the ATM multiplexing node that receives the message that was sent by the processing in the flowcharts in FIG. 32 and FIG. 33. In step S191, the SETUP message is received from the ATM network (WAN). In step S192, the VPI/VCI supervision data 303 are accessed with the path number of the path in which the said message was transferred as a key, and the "number of calls being originated" that was transferred as user—user information is set as the number of calls in the process of arriving".

Thus, in this embodiment, the signal bands for calls which are originated and calls which are arrived in each ATM multiplexing node are captured together, so that the duplicate securing of signal bands can be avoided, and the band capacity used effectively.

The ATM multiplexing node of this embodiment supports CBR (Constant Bit Rate), VBR (Variable Bit Rate), UBR (Unspecified Bit Rate) and ABR (Available Bit Rate) as service methods for transmitting signaling data. The transmission parameters in each category are stored in the main memory device 300 as the service category data 310.

In this embodiment, when the communication condition is normal (not congested), the signaling data are transferred by CBR or VBR; when the communication condition is congested, then it also becomes possible to transfer data by UBR or ABR. That is to say, in a condition in which the VCs that have been provided for CBR or VBR are all in use, if still more calls are placed, then signal VCs for UBR or ABR are established and the additional calls are assigned to them. As a result, signal VCs used for CBR or VBR, and signal VCs used for UBR or ABR, are in use at the same time, but since UBR and ABR only transmit cells when cells can be transmitted, the signal band capacity that needs to be secured does not increase.

FIG. 35 is a configuration diagram of the VPI/VCI supervision table. This table is, for example, established as part of the VPI/VCI supervision data 303. In the VPI/VCI supervision table, a service category is set for each VPI/VCI, and there is also a used/unused flag.

FIG. 36 and FIG. 37 are flowcharts of the processing that switches the service category. This processing is executed every time the ATM multiplexing node 10 detects a new call. Here, for simplicity, we describe the case in which CBR and ABR are provided as the service categories.

Steps S201 to S203 are the same as steps S21 to S233 in FIG. 15. A voice call from the PBX is detected; then the arrival ATM address corresponding to that voice call is detected; then the path number that identifies the path on which the SETUP message should be sent is extracted.

In step S204 and step S205, the VPI/VCI supervision table shown in FIG. 35 is searched with the "path number" that was extracted in step S203 as a key, and the system investigates whether or not an unused VPI/VCI that is used for CBR exists. If an unused VPI/VCI that is used for CBR exists, then, in step S211, one unused VPI/VCI for CBR use is extracted, and the VPI/VCI that was extracted is set in the call supervision data 307 as the VPI/VCI for the call that was detected in step S201. On the other hand, if an unused VPI/VCI that is used for CBR does not exist, then steps S206 and S213 are executed, and then the processing proceeds to step S211.

In step S206, referring to the service category data 310, the next category is detected. Here, let us assume that "ABR" has been detected. In step S213, the VPI/VCI supervision table shown in FIG. 35 is searched with the "path number" that was extracted in step S203 as a key, and one unused VPI/VCI for ABR use is extracted. Note that in a case in which steps S206 and S213 are executed, in step S211 the VPI/VCI that was extracted in step S213 is set in the call supervision data 307 as the VPI/VCI of the call that was detected in step S201. In step S212, the "traffic parameter information element" of the SETUP message corresponding to the call that was detected in step S201 is set, and that message is output to the ATM network 1. Note that in a case in which an unused VPI/VCI for CBR use exists, the CBR parameter is set; if one does not exist, then the ABR parameter is set.

Thus, in this embodiment, if a signal VC in CBR or VBR cannot be established, then a signal VC in UBR or ABR is established to make it possible to send signaling data. For this reason, the block rate (the call loss rate) is improved without essentially increasing the band.

In the method that was explained referring to FIG. 15 and FIG. 16 above, every time a voice call is placed the minimum necessary number of signal VCs were established; but depending on how the network is operated it is conceivable that there could be a system in which at least a minimum number of voice calls always exist. To respond to such a system, this embodiment establishes the number of signal VCs that has the band capacity corresponding to that fixed minimum number of calls, and provides a function which, if the number of calls increases-beyond the minimum, sequentially establishes signal VCs with the minimum necessary band by the method explained referring to FIG. 15 and FIG. 16 above.

Figure 38:
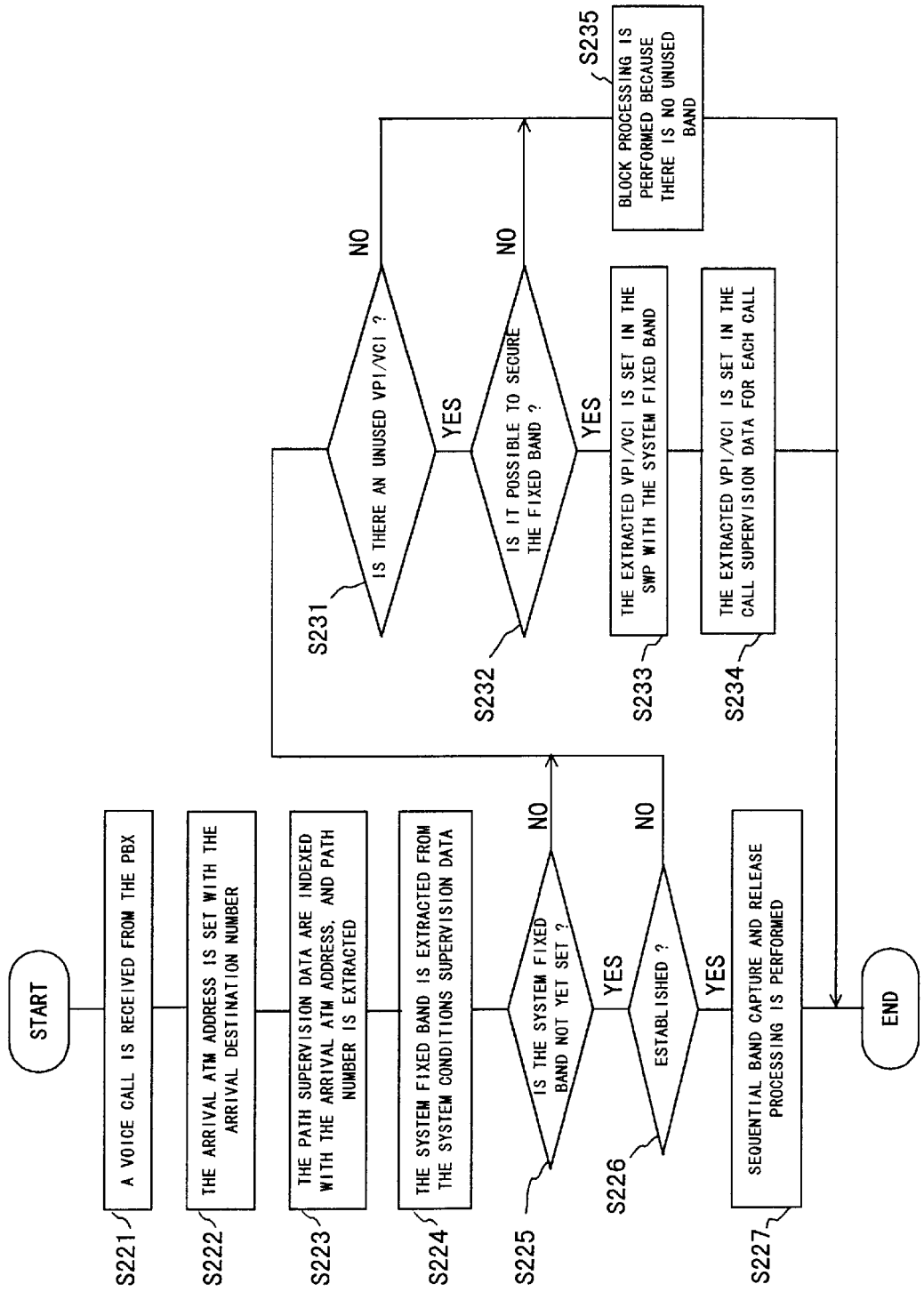
FIG. 38 is a flowchart of the band capture processing including a fixed band securing function.

FIG. 38 is a flowchart of the band capture processing including the fixed band securing function. This processing is executed every time the ATM multiplexing node 10 detects a new call.

Steps S221 to S223 are the same as steps S21 to S23 shown in FIG. 15. A voice call from the PBX is detected; then the arrival ATM address corresponding to that voice call is detected; then the path number that identifies the path in which the SETUP message should be sent is extracted.

In steps S224 to S226, the system conditions supervision data 304 are accessed and the "system fixed band" is extracted; the system then investigates whether or not that band has been set and whether or not a signal VC corresponding to the "system fixed band" in the corresponding path has already been established. Note that a "system fixed band" is set for each path in the system conditions supervision data 304; in addition, a flag is set in each path to indicate whether or not a signal VC that has that set band has already been established.

If the "system fixed band" has not been set, and if a signal VC that has that set band has already been established, then, in step S227, the capture or release processing shown in the flowcharts in FIGS. 14 to 16 is executed. On the other hand, if a "system fixed band" has been set or a signal VC that has that set band has not yet been established, then the processing that starts with step S231 is executed.

In steps S231 and S232, the VPI/VCI supervision data 303 are searched with the "path number" that was extracted in step S223 as a key, and the system investigates whether or not an unused VPI/VCI exists, and whether or not, if an unused VPI/VCI exists, the unused band is larger than the system fixed band. If an unused VPI/VCI exists, and in addition the unused band is larger than the system fixed band, then, in step S233, one of the said unused VPI/VCIs is selected. Then that selected VPI/VCI is set in the Switch Processor 129. In this way, a signal VC that has the band set as the "system fixed band" in the system conditions supervision data 304 is established.

Thus, after a signal VC that has the "system fixed band" in a certain path is established, a "system fixed band" flag corresponding to that path in the system conditions supervision data 304 is set to indicate "established". Then, in step S234, the unused VPI/VCI that was extracted in step S233 is set in the call supervision data 307 corresponding to the call that was detected in step S221.

Note that in steps S231 and S232, if there is no unused VPI/VCI, or if the unused band is smaller than the system fixed band, then block processing is executed in step S235. That is to say, for example the call that was detected in step S221 is rejected.

Note that in the processing in the flowchart shown in FIG. 38, when a call that is placed cannot be processed only within the system fixed band, the sequential capture processing in step S227 is executed; but this embodiment has a function that permits the user to select whether or not that sequential capture processing is executed.

FIG. 39 is a flowchart of the processing that selects the band capture method. This selection processing is, for example, executed immediately before step S227 in FIG. 38.

In steps S241 and S242, "sequential VC band capture condition" is extracted from the system conditions supervision data 304, and its content is investigated. If "perform sequential capture" is set as the "sequential VC band capture condition", then, in step S243 (step S227), the capture or release processing shown in FIGS. 14 to 16 is executed. If "do not perform sequential capture" is set as the "sequential VC band capture condition", then step S243 (step S227) is skipped.

Thus, in this embodiment, a signal VC that has a band corresponding to a certain fixed number of calls is established; then, if the number of calls increases beyond that, signal VCs having the minimum bands are sequentially established. This decreases the number of times that signal VCs have to be captured and released.

FIG. 40A is a diagram of a SETUP message. A SETUP message is generated when a call is placed; it is transferred from the terminal that originates the call to the ATM network, and then from the ATM network to the terminal at which the call arrives, in order to start setting the call up. Among the information included in the SETUP message, the "user—user information" can be stored in the specified information; its content is transferred transparently without interpretation by the ATM network. In this embodiment, as shown in FIG. 40B, it is possible for the "number of originated calls in process" and/or the "number of signal VCs in use" to be stored and transferred in this "user—user information" (see FIGS. 32 to 34).

FIG. 40C is a diagram of an INFO message. An INFOrmation message is used for the purpose of transferring information related to additional call control. In this embodiment, as shown in FIG. 40D, it is possible for "old VPI/VCI" and "new VPI/VCI" to be stored and transferred in the "user—user information" in an INFO message (see FIGS. 18 and 19).

Each message is, for example, stored and transferred within a "message information element group" in an ISDN message frame. The format of an ISDN message frame is shown in FIG. 41. Note that when a message is sent to the ATM network, this ISDN message frame is partitioned into fixed lengths (48 bytes) and each 48 bytes stored in the payload of an ATM cell.

Every time a voice call is placed, the minimum signal band is secured, so it is not necessary to assign a large band for voice calls in advance. For this reason, when the number of voice calls is small, the unused band capacity can be reassigned to other media, making for effective use of the band capacity.

If the number of calls assigned to a certain signal VC (the old VC) is small, those calls are reassigned to another signal VC, and the old VC is released. For this reason, the band that had been assigned to the old VC can be reassigned to other media, making more effective use of the band capacity.

A learning function is provided that monitors the actual communication conditions under certain conditions, then, the next time the same conditions occur, automatically sets the signal band in accordance with those communication conditions. This function reduces the work in supervising band operation.

What is claimed is:

1. A signal band control device that controls a band assigned to a signal channel, said signal channel for transmitting information needed for signaling, in a packet network that transfers fixed length packets, comprising:

detecting means for detecting a call origination and a release of a call;

capturing means for capturing a signal channel based on detection of a call origination by said detecting means;

releasing means for releasing a signal channel based on detection of release of a call by said detecting means;

number of calls setting means for respectively setting the maximum number of calls that can be assigned to each signal channel; and number of calls detecting means for detecting a number of calls respectively assigned to each of signal channels, wherein said capturing means newly captures a signal channel, when said detecting means detects a new call origination and all of the signal channels have respectively been assigned the maximum number of calls.

2. The signal band control device of claim 1, wherein when the number of calls assigned to a signal channel becomes 0 (zero) as a result of a call being released, said releasing means releases that signal channel.

3. The signal band control device of claim 1, further comprising:

parameter inputting means for permitting a user to input at least one of (a) the maximum band that can be used as a signal channel, (b) the band assigned to each signal channel, (c) the maximum number of signal channels that can be established, as a parameter to be used by said capturing means or releasing means.

4. A signal band control device that controls a band assigned to a signal channel of a plurality of signal channels dedicated to transmitting information needed for signaling, in a packet network that transfers fixed length packets, comprising:

detecting means for detecting a call origination and a release of a call;

capturing means for capturing a signal channel based on detection of a call origination by said detecting means;

releasing means for releasing a signal channel based on detection of release of a call by said detecting means; and reassignment means for, if the number of calls assigned to a first signal channel drops below a predetermined threshold, assigning a call that had been assigned to that first signal channel to a second signal channel, wherein said releasing means releases the first signal channel, when said reassignment means assigns the call that had been assigned to the first signal channel to the second signal channel.

5. A signal band control device that controls a band assigned to a signal channel of a plurality of signal channels dedicated to transmitting information needed for signaling, in a packet network that transfers fixed length packets, comprising:

detecting means for detecting a call origination and a release of a call;

capturing means for capturing a signal channel based on detection of a call origination by said detecting means; and releasing means for releasing a signal channel based on detection of release of a call by said detecting means, wherein in a case where a plurality of calls are newly originated substantially simultaneously, said capturing means establishes a signal channel that has a band corresponding to the number of the newly originated calls.

6. A signal band control device that controls a band assigned to a signal channel, said signal channel for transmitting information needed for signaling, in a packet network that transfers fixed length packets, comprising:

detecting means for detecting a call origination and a release of a call;

capturing means for capturing a signal channel based on detection of a call origination by said detecting means;

releasing means for releasing a signal channel based on detection of release of a call by said detecting means;

average band setting means for setting an average band to be used as a signal band; and establishing means for establishing a signal channel that has the average band set by said average band setting means.

7. The signal band control device according to claim 6, wherein said average band setting means sets the average band for each day of the week.

8. The signal band control device according to claim 6, wherein said average band setting means sets the average band for each time of day interval.

9. The signal band control device according to claim 6, wherein said average band setting means sets the average band for each date of the month.

10. The signal band control device according to claim 6, further comprising measuring means for measuring the actual used band in a signal channel established in accordance with the average band set for each day of the week, for each time of day interval, or for each date of the month.

11. A signal band control device that controls a band assigned to a signal channel, said signal channel for transmitting information needed for signaling, in a packet network that transfers fixed length packets, comprising:

detecting means for detecting a call origination and a release of a call;

capturing means for capturing a signal channel based on detection of a call origination by said detecting means;

releasing means for releasing a signal channel based on detection of release of a call by said detecting means;

learning means for monitoring communication conditions under certain predetermined condition; and establishing means for establishing a signal channel that has a band corresponding to the communication conditions detected by said learning means under the predetermined condition.

12. The signal band control device according to claim 11, further comprising selecting means for permitting a user to select whether said establishing means should operate in accordance with said learning means or in accordance with the average band set by the user for each day of the week, for each time of day interval, or for each date of the month.

13. A signal band control device that controls a band assigned to a signal channel, said signal channel for transmitting information needed for signaling, in a packet network that transfers fixed length packets, comprising:

detecting means for detecting a call origination and a release of a call;

capturing means for capturing a signal channel based on detection of a call origination by said detecting means; and releasing means for releasing a signal channel based on detection of release of a call by said detecting means, wherein the maximum number of signal channels for a first communication service is determined; and wherein said capturing means captures and establishes a signal channel for a second communication service, if the number of signal channels established when said detecting means detects a new call origination has reached the maximum number.

14. The signal band control device according to claim 13, wherein the first communication service is CBR (Constant Bit Rate) or VBR (Variable Bit Rate), and the second communication service is UBR (Unspecified Bit Rate) or ABR (Available Bit Rate).

15. A signal band control device that controls a band assigned to a signal channel in a packet network that transfers fixed length packets, comprising:

detecting means for detecting a call origination and a release of a call;

capturing means for capturing a signal channel based on detection of a call origination by said detecting means; and releasing means for releasing a signal channel based on detection of release of a call by said detecting means, wherein a band of a first signal channel that was initially captured by said capturing means is larger than each band of second and subsequent signal channels captured after the first signal channel.

16. The signal band control device according to claim 15, further comprising capturing procedure setting means for setting whether or not the second and subsequent signal channels are to be captured by said capturing means.

17. A signal band control device that has one or more paths on a packet network that transfers fixed length packets, and that controls the assignment of bands to signal channels in each path, said signal channels being dedicated to transmitting information needed for signaling, comprising:

detecting means for detecting a call origination and a release of a call in each path;

capturing means for capturing a signal channel in each path based on detection of a call origination by said detecting means;

releasing means for releasing a signal channel in each path based on detection of release of a call by said detecting means;

number of calls setting means for respectively setting the maximum number of calls that can be assigned to each signal channel, and number of calls detecting means for detecting a number of calls respectively assigned to each of signal channels, wherein said capturing means newly captures a signal channel, when said detecting means detects a new call origination and all of the signal channels have respectively been assigned the maximum number of calls.

18. A signal band control device that controls a band assigned to a signal channel, said signal channel for transmitting information needed for signaling, in a packet network that transfers fixed length packets, comprising:

detecting means for detecting a call origination;

determining means for determining the number of signal channels based on the number of calls detected by said detecting means; and number of calls setting means for setting the maximum number of calls that can be assigned to each signal channel, wherein a new signal channel is captured if all of the signal channels established when said detecting means detects a new call origination have respectively been assigned the maximum number of calls.

19. A method of controlling a band assigned to a signal channel of a plurality of signal channels dedicated to transmitting information needed for signaling, in a packet network that transfers fixed length packets, comprising the steps of:

setting bands in each signal channel of said plurality of signal channels;

detecting a call origination and a release of a call;

capturing a signal channel based on detection of a call origination;

number of calls setting-means for respectively setting the maximum number of calls that can be assigned to each signal channel; and number of calls detecting means for detecting a number of calls respectively assigned to each of signal channels, wherein said capturing-means newly captures a signal channel, when said detecting means detects a new call origination and all of the signal channels have respectively been assigned the maximum number of calls.

* * * * *